US009487613B2

(12) United States Patent
Stojcevic et al.

(10) Patent No.: US 9,487,613 B2
(45) Date of Patent: Nov. 8, 2016

(54) METHODS FOR PREPARATION OF NOVEL GRAFT COPOLYMERS

(75) Inventors: Goran Stojcevic, Antwerpern (BE); Lorenzo P. Ferrari, Brights Grove (CA); Dana K. Adkinson, London (CA); Elizabeth R. Gillies, London (CA); Collin V. Bonduelle, London (CA); Solmaz Karamdoust, London (CA)

(73) Assignees: LANXESS International S.A., Granges-Paccot (CH); University of Western Ontario, London, Ontario (CA)

( * ) Notice: Subject to any disclaimer, the term of this patent is extended or adjusted under 35 U.S.C. 154(b) by 697 days.

(21) Appl. No.: 13/816,549

(22) PCT Filed: Aug. 11, 2011

(86) PCT No.: PCT/CA2011/050487
§ 371 (c)(1),
(2), (4) Date: Sep. 16, 2013

(87) PCT Pub. No.: WO2012/019302
PCT Pub. Date: Feb. 16, 2012

(65) Prior Publication Data
US 2013/0345367 A1    Dec. 26, 2013

Related U.S. Application Data

(60) Provisional application No. 61/373,398, filed on Aug. 13, 2010.

(51) Int. Cl.
| | | |
|---|---|---|
| *C08F 279/02* | (2006.01) |
| *C08F 8/00* | (2006.01) |
| *C08F 8/08* | (2006.01) |
| *C08F 8/14* | (2006.01) |
| *C08G 81/02* | (2006.01) |
| *C08F 210/12* | (2006.01) |
| *C08C 19/30* | (2006.01) |
| *C08J 3/03* | (2006.01) |
| *C08F 236/08* | (2006.01) |

(52) U.S. Cl.
CPC ............ *C08F 279/02* (2013.01); *C08C 19/30* (2013.01); *C08F 8/00* (2013.01); *C08F 8/08* (2013.01); *C08F 8/14* (2013.01); *C08F 210/12* (2013.01); *C08F 236/08* (2013.01); *C08G 81/025* (2013.01); *C08J 3/03* (2013.01); *C08J 2323/22* (2013.01); *C08J 2323/26* (2013.01)

(58) Field of Classification Search
CPC .... C08C 19/30; C08F 210/12; C08F 236/08; C08F 279/02; C08F 8/00; C08F 8/08; C08F 8/14; C08G 81/025; C08J 3/03; C08J 2323/22; C08J 2323/26
USPC .............. 525/332.8, 350, 377, 379
See application file for complete search history.

(56) References Cited

U.S. PATENT DOCUMENTS

2009/0076212 A1    3/2009  Lewtas et al.

OTHER PUBLICATIONS

McLean et al. (Synthesis of graft copolymer derivatives of brominated poly(isobutylene-co-isoprene), European Polymer Journal 43 (2007) 4619-4627).*
Puskas, Judit E., "Biomedical Application of Commercial Polymers and Novel Polyisobutylene-Based Thermoplastic Elastomers for Soft Tissue Replacement", American Chemical Society, vol. 5, No. 4, Jul./Aug. 2004.
Puskas, Judit E., "Polyisobutylene-Based Biomaterials", Journal of Polymer Science, Part A:Polymer Chemistry, vol. 42, 3091-3109 (2004).
Pinchuk, L, Medical applications of poly(styrene-block-isobutylene-block-styrene) ("SIBS"). Biomaterials, Feb. 2008, vol. 29, Issue 4, pp. 448-460.
Isayeva, I.S., "Characterization and perforamnce of membranes designed for macroencapsulation/implantation of pancreatic islet cells." Sep. 2003, vol. 24, Issue 20, pp. 3483-3491.
Cadieux, P. "Potential application of polyisobutylene-polystyrene and a Lactobacillus protein to reduce the risk of device-associated urinary tract infections.", Colloids and Surfaces B: Biointerfaces 28 (2003) pp. 95-105.
Harris, J.M., "Introduction to Biotechnical and Biomedical Applications of Poly(Ethylene Glycol)", Poly(ethylene Glycol) Chemistry, 1992, pp. 1-14.
Andrade, J.D., "Poly(ethylene oxide) and Protein Resistance", Hydrophilic Polymers, 1996, pp. 51-59.
Leckband, D. "Grafted poly(ethylene oxide) brushes as nonfouling surface coatings", Journal of Biomaterial Science Polymer, Edition 10, 1999, pp. 1125-1147.
Krishnan, S. "Advances in polymers for anti-biofouling surfaces", Journal Materials Chemistry, 2008, 18, pp. 3405-3413.
Gao, Bo, "Synthesis of tri-block copolymer based on polyisobutylene and poly(ethylene glycol)", Polymer Bulletin, 34, pp. 279-286 (1995).
Wiley, J., "Synthesis of a Block Copolymer Containing Polyisobutylene and Polyethylene Oxide Segments", Journal of Polymer Science, vol. 19, pp. 2119-2122, 1981.
Kurian, P., "Synthesis and Characterization of Novel Amphiphilic Block Copolymers Di-, Tri-, Multi-, and Star Blocks of PEG and PIB.", Journal of Polymer Science: Part A: Polymer Chmistry, vol. 38, pp. 3200-3209, 2000.
Yamashita, S. Chemical Modification of Butyl Rubber. I. Synthesis and Properties of Poly (ethylene oxide)—Grafted Butyl Rubber, Journal of Polymer Science: Part A: Polymer Chemistry, vol. 31, pp. 2437-2444, 1993.
McLean, J. "Synthesis of graft copolymer derivatives of brominated poly (isobutylene-co-isoprene)", European Polymer Journal, 43 (11): pp. 4619-4627, 2007.

(Continued)

*Primary Examiner* — Ling Choi
*Assistant Examiner* — Chun-Cheng Wang

(57) ABSTRACT

The present invention relates to novel graft copolymers of functionalized poly(isoolefin-co-conjugated diolefin, and a process of preparing such graft copolymers. The present invention also relates to a method of preparing functionalized copolymers of isoolefins and conjugated diolefins.

25 Claims, 15 Drawing Sheets

(56) References Cited

OTHER PUBLICATIONS

McLean, K. J., "Phase-Transfer Catalyzed Esterification of Brominated Poly (Isobutylene-co-Isoprene)", Industrial Engineering Chemical Research, 2009, 48, pp. 10759-10764, Nov. 10, 2009.

Parent, J. S., "Nuceleophilic catalysis of halide displacement from brominated poly(isobutylene-co-isoprene)", European Polymer Journal, 46(4) pp. 702-708, 2009.

Xiao, S., "Synthesis and Characterization of Poly (isobutylene-co-isoprene)-Derived Macro-Monomers", Journal of Polymer Science: Part A: Polymer Chemistry, vol. 48, 4691-4696, 2010.

Ikeda, Y., "Chemical Modification of Butyl Rubber. II. Structure and Properties of Poly(ethylene oxide)-Grafted Butyl Rubber", Journal of Polymer Science: Part B: Polymer Physics, vol. 33, 387-394, 1995.

International Search Report from co-pending Application PCT/CA2011/050487 dated Jan. 10, 2012, 2 pages.

* cited by examiner

METHODS FOR PREPARATION OF NOVEL GRAFT COPOLYMERS

FIELD OF THE INVENTION

The present invention relates generally to polyisoolefin graft copolymers, specifically to novel graft copolymers of functionalized poly(isoolefin-co-conjugated diolefin) and a process of preparing such graft copolymers.

BACKGROUND

Copolymers are of significant interest for a diverse range of applications, as they can impart the material with properties of both individual polymers as well as new properties of the combinations. Thus far a significant body of research has been carried out on linear diblock and triblock copolymers, and behaviour of these materials is relatively well understood. While comb-like or graft copolymer architectures have provided access to new materials, in general, there are relatively few examples involving these more complicated polymer architectures and their properties such as on surfaces, films, and their assemblies in aqueous solution are less well understood. However, they present interesting properties including the ability to finely tune their architectures by adjusting the grafting densities and relative chain lengths.

In recent years, much research has emerged to suggest that polyisobutylene (PIB)-based materials are highly promising for a number of biomedical applications (Puskas et al., Biomacromolecules 2004, 5, 1141-1154 and J. Polym. Sci. Part A: Polym. Chem. 2004, 42, 3091-3109). For example, PIB-polystyrene (PS) triblock copolymers are currently being used as a drug eluting coating on TAXUS® vascular stents (Pinchuk et al., Biomaterials 2008, 29, 448-460.). Copolymers of PIB with hydrophilic polymers such as poly(N,N-dimethylacrylamide) or poly(ethylene oxide) (PEO) have been used to form membranes that can encapsulate cells while allowing the exchange of oxygen, nutrients, and secreted proteins such as insulin across the membrane (Isayeva et al., Biomaterials 2003, 24, 3483-3491). However, optimization of the polymer chemistry and properties is still critical for many applications. For example, when PIB-PS was explored as a potential implant material in the urinary tract, significant attachment of uropathogenic species such as E. coli 67 was observed, indicating that the surface properties of the polymer were not ideal for this application (Cadieux et al., Colloids Surf, B 2003, 28, 95-105).

The incorporation of PEO into PIB-based materials is of particular interest as it is known to confer resistance of the surface to proteins, which is a significant asset for biomedical devices and implants that often otherwise undergo rapid biofouling (Cadieux et al., Colloids Surf, B 2003, 28, 95-105; Harris, M. J., Poly(ethylene glycol) Chemistry: Biotechnical and Biomedical Applications. Plenum Press: New York, 1992; Andrade et al., Hydrophilic Polymers. In Glass, J. E., Ed. American Chemical Society: Washington D.C., 1996; Vol. 248, pp 51-59; Leckband et al., J. Biomater. Sci. Polym. Ed. 1999, 10, 1125-1147; Hoffman, A. S. J. Biomater. Sci. Polym. Ed. 1999, 10, 1011-1014; and Krishnan et al., J. Mater. Chem. 2008, 18, 3405-3413).

The grafting of PEO onto PIB is also of significant interest due to enhanced mechanical properties, increased wettability, microphase separation, and emulsifying properties observed in these polymers.

PIB-PEO linear block copolymers have previously been reported, but their syntheses are not straightforward as they typically involve a living cationic polymerization to form an end-functionalized PIB block, followed by the coupling of PEO to the terminus using this functionality (Kennedy, J. P.; Ivan, B., Designed Polymers by Carbocationic Macromolecular Engineering Theory and Practice. Hanser: New-York, 1992; and Kaszas et al., J. Macromol. Sci., Chem. 1989, A26, 1099-1114). For example, Gao and Kops coupled phenol-terminated PIB with tosylated PEO (Gao, B.; Kops, J. Polym. Bull. 1995, 34, 279-286), Roony reacted the same end-functionalized PIB with PEO by isocyanate chemistry (Rooney, J. M. J. Polym. Sci. Part A: Polym. Chem. 1981, 19, 2119-2122), and Kurian et al. used a coupling between silane functionalized PIB and allyl functionalized PEO (J. Polym. Sci. Part A: Polym. Chem. 2000, 38, 3200-3209). However, each of these examples involved some degree of side reactions and/or low yields.

The grafting of PEO onto butyl rubber, a copolymer of isobutylene and small percentages of isoprene, has also been explored, but has been limited by challenges associated with solubility, low reactivity, and purification. Kohjiya and coworkers have prepared butyl rubber-PEO graft copolymers by the reaction of chlorinated and brominated butyl rubber with the potassium salt of PEO monomethyl ether (m-PEO), where the reactions were performed from 80° C. to 110° C. (J. Polym. Sci. Part. A Polym. Chem. 1993, 31, 2437-2444). Whitney, Parent and coworkers have explored the grafting of PEO onto bromobutyl using both the potassium salt of m-PEO as well as a carboxylate derivative, wherein limitations imposed by the molecular weight of the PEO were mentioned and the purified copolymers contained substantial amounts of conjugate diene (dehydrobromination side reaction limited reaction yield) because the reaction was performed at 115° C. with several equivalents of KOH (Eur. Polym. J. 2007, 43, 4619-4627). An additional example by Parent and coworkers involved the use of an acid terminated PEO of MW 700 g/mol, wherein reactions were performed at 90° C. Overall, the above reaction conditions are relatively harsh (extensive heating/strongly basic conditions) and there are significant degrees of side reactions limiting the reaction yields and resulting PEO content. Although recent catalytic approaches appear to be more promising, incomplete couplings as well as side reactions such as eliminations to the conjugated diene typically observed (McLean et al., Ind. Eng. Chem. Res. 2009, 48, 10759-10764; and Parent et al., Eur. Polym. J. 2010, 46, 702-708).

SUMMARY OF THE INVENTION

It is an object of the present invention to provide novel graft copolymers and their methods of preparation. In accordance with an aspect of the present invention there is provided a method/process of functionalizing a copolymer comprising repeating units derived from at least one C4-C8 isoolefin and repeating units derived from at least one C4-C16 conjugated diolefin, comprising the steps of a) converting one or more C—C double bonds along the backbone of the copolymer into one or more allylic hydroxyl sites, and b) reacting the one or more allylic hydroxyl sites with an activating reagent having the formula:

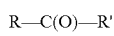

to convert one or more hydroxyl groups of the allylic hydroxyl sites into —OC(O)—R functional group, wherein R and R' are each independently:

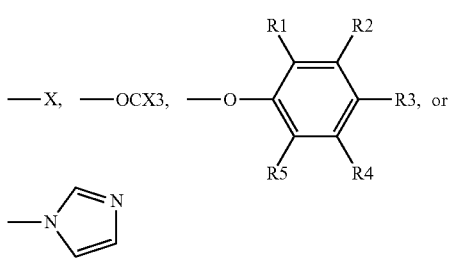

wherein X is halogen, R1 to R5 are each independently H, NO₂, halogen or C1-C6 alkyl.

In an another aspect of the present invention, there is provided a functionalized copolymer comprising repeating units derived from at least one C4-C8 isoolefin and repeating units derived from at least one C4-C16 conjugated diolefin, wherein the copolymer comprises one or more units derived from the at least one conjugated diolefin wherein the C—C double bond along the backbone of the copolymer is functionalized with a group —OC(O)—R, wherein R is a leaving group.

In an another aspect of the present invention, there is provided a process for preparing a graft copolymer comprising the steps of a) providing a functionalized copolymer comprising repeating units derived from at least one C4-C8 isoolefin and repeating units derived from at least one C4-C16 conjugated diolefin, wherein the copolymer comprises one or more units derived from the at least one conjugated diolefin wherein the C—C double bond along the backbone of the copolymer is functionalized with a group —OC(O)—R, wherein R is a leaving group; and b) reacting the functionalized copolymer with a polymeric nucleophile via nucleophilic substitution of the leaving group of the functionalized copolymer to graft a polymer on to the copolymer, wherein the polymeric nucleophile comprises the polymeric substrate having a nucleophilic group capable of donating electrons to the carbonyl group of the fucntionalized copolymer thereby displacing the leaving group therefrom.

In an another aspect of the present invention, there is provided a graft copolymer comprising a polyalkylene oxide polymer grafted onto a backbone of a functionalized copolymer comprising repeating units derived from at least one C4-C8 isoolefin and repeating units derived from at least one C4-C16 conjugated diolefin, wherein the copolymer comprises one or more units derived from the at least one conjugated diolefin wherein the C—C double bond along the backbone of the copolymer comprises a functional group —OC(O)—, wherein the polymer is grafter through this functional group.

DETAILED DESCRIPTION OF THE INVENTION

Figure 1:
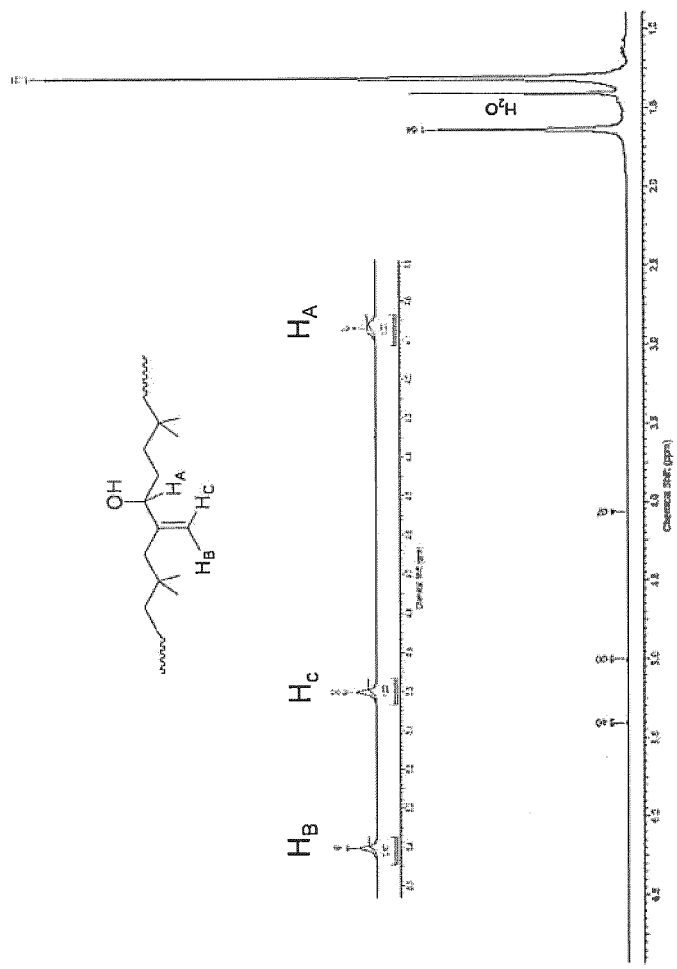
FIG. 1 shows a ¹H NMR spectrum of the hydroxyl functionalized butyl rubber 3.
Figure 2:
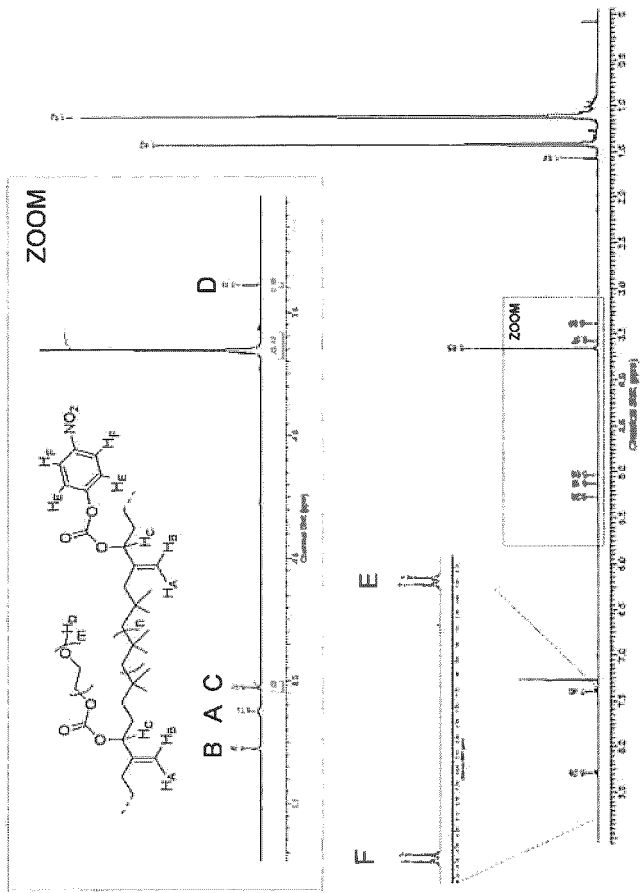
FIG. 2 shows a ¹H NMR spectrum of copolymer 11 (in CDCl₃)

The present invention relates to novel graft copolymers, and methods of preparing these copolymers. The present invention also relates to functionalized poly(isoolefin-co-conjugated diolefin) copolymers, a method of preparing these functionalized copolymers and their use in the preparation of the graft copolymers of the present invention.

Graft Copolymers

The graft copolymers of the present invention comprise a polymer grafted onto a backbone of a functionalized copolymer comprising repeating units derived from at least one isoolefin and repeating units derived from at least one conjugated diolefin. The term "functionalized copolymer" used herein defines a copolymer comprising units derived from the isoolefin and one or more units derived from the at least one conjugated diolefin wherein one or more C—C double bonds along the backbone of the copolymer are converted into an epoxide group or a C—C single bond having a substituent such as hydroxy, or —OC(O)— group on at least one of the carbon atoms.

In one embodiment, the graft copolymer of the present invention comprises one or more units represented by the formula (I):

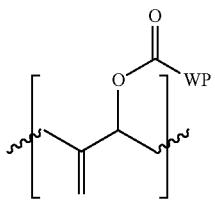

(I)

wherein W is O, NH or S, and P is a polymer grafted onto the functionalized copolymer.

In one embodiment, the graft copolymer of the present invention comprises randomly repeating units a and b represented in the formula (II):

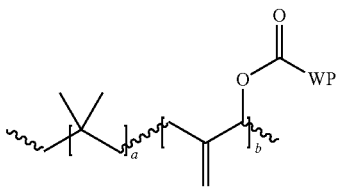

(II)

wherein the combination of a+b represents the empirical formula of substantially random graft copolymer, wherein the ratio of a:b is [about 13 to about 2000]:[about 1 to about 200].

In one embodiment, the graft copolymer of the present invention is represented by the formula (III):

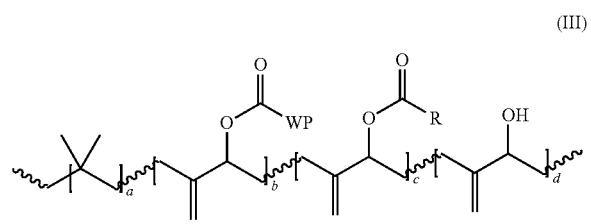

(III)

wherein the combination of a+b+c+d represents the empirical formula of substantially random graft copolymer, wherein a is about 10 to about 2000, b is about 1 to about 200, c is 0 to 200, and d is 0 to about 200, wherein W is O, NH or S, P is a polymer grafted on the copolymer, and R is a leaving group.

In one embodiment, the graft copolymers of the present invention comprise about 0.5 wt % to about 95 wt % of the polymer grafted onto the functionalized copolymer backbone.

In one embodiment, the graft copolymers of the present invention comprise polyalkylene oxide, polyalkylene glycol, polyethylene, polypropylene, polystyrene, or their hybrids grafted onto the backbone of the functionalized copolymer.

In one embodiment, the graft copolymers of the present invention comprise polyalkyleneoxides which are grafted onto the backbone of the functionalized copolymer, wherein the alkylene group has 1 to 6 carbon atoms.

In one embodiment, the moiety WP of the graft copolymers of the present invention is represented by the formula (IV):

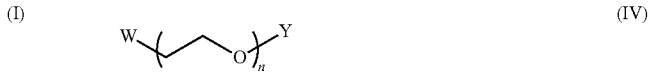

(IV)

grafted onto the backbone of the functionalized copolymer, wherein W is O, NH or S, Y is C1-C6 alkyl and n is an integer from 10 to 120.

In one embodiment the graft copolymer of the present invention has a weight average molecular weight of 450000 to 6000000 g/mol. In one embodiment the graft copolymer of the present invention has a weight average molecular weight of 500000 to 5500000 g/mol.

The graft copolymers of the present invention are prepared by functionalizing a copolymer of at least one isoolefin and at least one conjugated diolefin and reacting the functionalized copolymer with a polymeric nucleophile.

Functionalization of C—C Double Bond of a Copolymer

The present invention also relates to a method/process of functionalizing a copolymer comprising repeating units derived from a C4-C8 isoolefin and repeating units derived from a C4-C16 conjugated diolefin. The method involves the steps of converting one or more C—C double bonds along the backbone of the copolymer into one or more allylic hydroxyl sites and reacting these one or more allylic hydroxyl sites with an activating reagent to functionalize the copolymer.

The activating reagent can be represented by the formula:

R—C(O)—R' wherein R and R' are each independently a leaving group. Non-limiting examples of suitable leaving groups are:

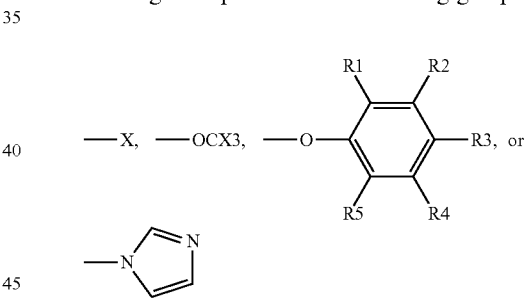

wherein X is halogen, R1 to R5 are each independently H, $NO_2$, halogen or C1-C6 alkyl.

The step of converting the one or more C—C double bonds into the one or more allylic sites can comprise epoxidizing the one or more C—C double bonds and reacting the resulting epoxidized copolymer with a protic acid to open the epoxide ring, thereby converting the one or more epoxidized C—C double bonds into the one or more allylic hydroxyl sites.

Peroxide reagents known in the art can be used in the epoxidation step. Non limiting examples of such reagents are hydrogen peroxide, peroxycarboxylic acids (generated in situ or preformed), alkyl hydroperoxides, and dimethyldioxirane. In one embodiment, the epoxidizing agent is perbenzoic acid or m-chloroperbenzoic acid.

The protic acids used in the ring opening step of the epoxide can be selected from the group consisting of HCl, HBr, HF, $H_2SO_4$, $HNO_3$, $CF_3COOH$.

The solvents used in the epoxidation step and in the ring opening of the epoxide can be any solvent that solubilizes the copolymer. Non-limiting examples of such solvents are toluene, hexanes, chloroform, dichloromethane, tetrahydrofuran, etc.

The epoxidation and the ring opening steps can be carried out at room temperature.

The un-functionalized copolymers used in the present invention comprise from about 0.5 to about 20 mol % of repeating units derived from conjugated diolefin and from about 80 to about 99.5 mol % of repeating units derived from isoolefin. In one embodiment, the conjugated diolefin units are from 1 to 10 mol %. In another embodiment, the conjugated diolefin units are from 2 to 8 mol %.

The un-functionalized copolymers used in the present invention have a weight average molecular weight of about 250000 to 1,500,000 g/mol.

The isoolefins suitable for use in the present inventions are hydrocarbon monomers having about 4 to about 10 carbon atoms. Illustrative non-limiting examples of these isoolefins are isobutylene, 2-methyl-1-butene, 3-methyl-1-butene, 2-methyl-2-butene, 4-methyl-1-pentene, 2-methyl-1-pentene, etc. In one embodiment, the isoolefin is isobutylene.

The conjugated diolefin for use in the methods of the presently claimed invention can be represented by a general formula:

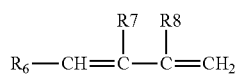

wherein R6 is a hydrogen atom or an alkyl group containing in the range from 1 to 4 carbon atoms and wherein R7 and R8 can be the same or different and are selected from the group consisting of hydrogen atoms and alkyl groups containing in the range from 1 to 4 carbon atoms.

In one embodiment of the above formula one of R7 and R8 is other than H.

Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like.

In one embodiment, the conjugated diolefins incorporated in the copolymer of the present invention have 4 to 8 carbon atoms.

In one embodiment, the conjugated diolefin is isoprene.

In one embodiment, the un-functionalized copolymer comprises one or more isoprene unit represented by the formula (V):

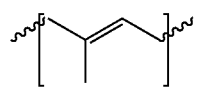

(V)

In the functionalization process, one or more of the isoprene units as shown above are converted into one or more allylic hydroxyl sites, represented by the formula (VI):

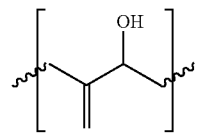

(VI)

The allylic hydroxide containing isoprene units (i.e., allylic hydroxyl sites) are then converted into one or more functionalized isoprene units represented by the formula (VIII):

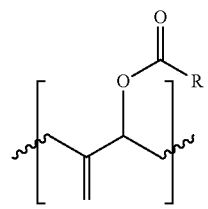

(VIII)

wherein R is a leaving group. Non-limiting examples of the leaving group are:

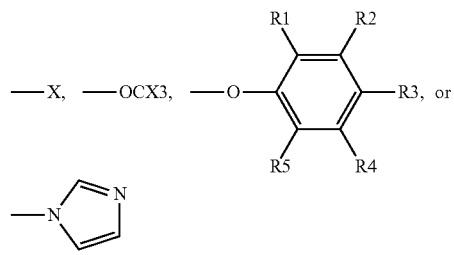

wherein X is halogen, R1 to R5 are each independently H, NO$_2$, halogen or C1-C6 alkyl.

In one embodiment, the un-functionalized copolymer is a butyl rubber. In one embodiment the butyl rubber is butyl rubber RB402 comprising 2.2 mol % isoprene units or a butyl rubber comprising 7 mol % isoprene units.

In one embodiment the butyl rubber is butyl rubber RB100 or RB301.

In one embodiment, the functionalized copolymer of the present invention comprises randomly repeating units a and b represented by the formula (IX):

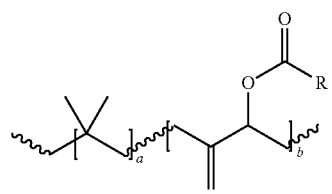

(IX)

wherein the combination of a+b represents the empirical formula of substantially random graft copolymer, wherein the ratio of a:b is [about 13 to about 2000]: [about 1 to about 200], and R is
the leaving group as defined above.

In one embodiment, the functionalized copolymer of the present invention is represented by the formula (X):

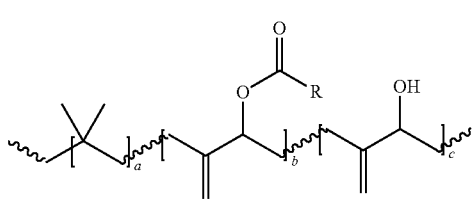

(X)

wherein the combination of units a+b+c represents the empirical formula of substantially random graft copolymer, wherein units a ranges from about 10 to about 2000, unit b is from about 1 to about 200, and unit c is 0 to 200, and d is 0 to about 200, and R is as defined above.

In one embodiment, the present method of functionalization provides about 3% to 100% functionalization of the diolefin units. In one embodiment, the functionalization of the diolefin units is 75% to 100%.

In one embodiment the functionalized copolymer has a weight average molecular weight of about 250000 to about 2000000 g/mol. In one embodiment the functionalized copolymer has a weight average molecular weight of about 300000 to about 1500000 g/mol.

Preparation of Graft Copolymers

The graft copolymers of the present invention can be prepared by reacting the functionalized copolymers with a polymeric nucleophile. The term polymeric nucleophile used herein relates to a polymeric substrate having a nucleophilic group capable of donating electrons to the carbonyl group of the functionalized copolymer thereby capable of displacing the leaving group therefrom. In one embodiment, the nucleophilic group is OH, $NH_2$ or SH.

The term "polymeric substrate" used herein includes a linear or branched, organic, inorganic or organometallic polymer and their hybrids. Functionalization of these polymers with a nucleophile such as a hydroxyl, an amino or a thiol functionality can be achieved by employing common organic and inorganic synthetic methodologies. Examples of polymeric substrates include, but are not limited topolyethylene, polypropylene, or polystyrene.

In one embodiment, the polymeric nucleophile is polyalkylene oxide or polyalkylene glycol.

In one embodiment, the polymeric nucleophile is represented by the formula:

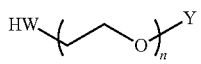

wherein W is O, S or NH, Y is C1-C6 alkyl and n is an integer from 10 to 120. In one embodiment, the polymeric nucleophile is PEO-OH, PEO-$NH_2$ or PEO-SH.

In one embodiment, the polymeric nucleophile has a molecular weight of at least 750 g/mol. In one embodiment, the molecular weight of the polymeric nucleophile is from about 750 to about 5000 g/mol.

The methods of functionalization of the C—C double bond, and method of grafting a polymer onto the backbone of the functionalized copolymers as described in the present applications involve easy reaction sequences, inexpensive reagents and are conducted under mild and moderate conditions as compared to previously known methods of grafting copolymers such as PEO on copolymers such as butyl rubber. These reactions are substantially free of side reaction and provide essentially quantitative conversions.

The method of grafting of polymers as described in the present application provides for controlling the final content of the grafted polymer via varying number of equivalents and/or the molecular weight of the polymeric nucleophile, thus allowing the preparation of graft copolymers with desired amount of grafted polymer exhibiting desired properties. At lower PEO content, the graft copolymers have utility for modifying the swelling properties of rubber (for hygroscopic coating reagents, packing materials, water leak sensors) and as emulsifiers as previously suggested by Kohjiya and coworkers (J. Polym. Sci. Part. A Polym. Chem. 1993, 31, 2437-2444.; and Polym. Phys. 1995, 33, 387-394). At higher PEO content, such as the grafting of PEO of 75% or more of the double bond units in the polymer, the polymers resist protein adsorption when coated onto surfaces as demonstrated below. This property is useful for biomedical applications such as blood contacting materials (stent coatings, drug eluting coatings), and other biomaterials (breast implants, catheter coatings). It also enables the preparation of aqueous assemblies/dispersions of butyl rubber. As these dispersions contain hydrophobic cavities they can be used to encapsulate and deliver drugs and/or imaging agents (eg. MRI, CT, SPECT, PET contrast agents).

The invention will now be described with reference to specific examples. It will be understood that the following examples are intended to describe embodiments of the invention and are not intended to limit the invention in any way.

Materials:

Silicon wafers were purchased from University Wafer (Boston, USA). Butyl rubber RB402 (weight-average molecular weight $M_w$ of 400000 g/mol) composed of 2.2 mol % of isoprene units and a butyl rubber composed of 7 mol % of isoprene units (weight-average molecular weight $M_w$ of 916000 g/mol) were obtained from LANXESS. PEO-$NH_2$ of different molecular weights (750, 2000 and 5000 g/mol) were purchased from Iris Biotech GMBH (Marktredwitz, Germany). Solvents were purchased from Calcdon and all other chemicals were purchased from Sigma Aldrich and were used without further purification unless otherwise noted. 4-(Dimethylamino)pyridine (DMAP) was purified by re-crystallization in toluene before use. m-Chloroperbenzoic acid was dissolved in toluene and dried with $MgSO_4$ before use. Pyridine was distilled over $CaH_2$ before use. Dry toluene was obtained from a solvent purification system. $^1$H NMR spectra were obtained in $CDCl_3$ at 400 MHz or 600 MHz. NMR chemical shifts are reported in ppm and are calibrated against residual solvent signals of $C_6D_6$ or $CDCl_3$ (δ 7.16, 7.26). Coupling constants (J) are reported in Hz. Thermogravimetric analyses were performed on a Mettler Toledo TGA/SDTA 851$^e$ at a heating rate of 10° C./min. Differential scanning calorimetry (DSC) was performed on a Mettler Toledo DSC 822$^e$ at a heating rate of 10° C./min from −120 to 150° C.

General Procedures:

Molecular Weight Determination

Molecular weights are determined by size exclusion chromatography (SEC) or light scattering (LS) analysis.

Size exclusion chromatography (SEC) was carried out in THF using a Waters 2695 separations module equipped with a 2414 differential refractometer and two Resipore (300 mm×7.5 mm) columns from Polymer Laboratories. The calibration was performed using polystyrene standards.

For light scattering analysis, first the differential refractive index increment (dn/dc) values for each polymer in THF were determined using a Wyatt Optilab Rex refractive index detector and Wyatt Astra software. Next, time averaged light scattering intensities were measured for each polymer at a series of concentrations from 0.2 mg/mL to 1.2 mg/mL in THF using a Malvern Zetasizer Nano-S instrument. Toluene was used as a standard. Using this data, the weight average molecular weight ($M_w$) for each polymer was determined from the Rayleigh equation: $KC/R_\theta=(1/M_w+2A_2C)P(\theta)$ using a Debye plot: $KC/R_\theta$ versus C, allowing $1/M_w$ to be determined as the y-intercept. C=polymer concentration; $R_\theta$=excess Rayleigh ratio–the ratio of scattered and incident light intensity; $A_2$=second viral coefficient which is a measure of solute-solvent interactions; $P(\theta)$=scattering function which relates the angular variation in scattering intensity to the mean square radius of the particle; $K=4\pi^2/\lambda_o^4 N_A[n_o(dn/dc)]^2$ where $\lambda_o$=vacuum wavelength of incident light; $N_A$=Avogadro's number; $n_o$=solvent refractive index.

Preparation of Thin Films by Spin-Casting

Silicon wafers were cut in small pieces (1 cm$^2$) and were cleaned by immersion in an $H_2O_2/H_2SO_4$ (1:2) solution overnight. They were then rinsed with deionized water and dried at 100° C. Thin films of copolymers were prepared by spin-casting a solution of the material in $CH_2Cl_2$. Spin casting conditions were 100 μL for 1 cm$^2$ of silicon wafer, 4000 rpm, 30 s.

Preparation of Melt-Pressed Films

Melt pressed films were prepared using a hydraulic heated press (Hydraulic Unit Model #3912, Carver Inc., Wabash, Ind.). All copolymers were pressed at 120° C. within a pressure of 250 kPa for 15 seconds.

Protein Adsorption and Confocal Laser Scanning Microscopy

A 1 mg/mL solution of the rhodamine-fibrinogen conjugate[56] in 5 mM phosphate buffer, pH 7.2 was prepared. The surface was then immersed in this protein solution. After 30 min., nonadsorbed proteins were removed by washing the surface with buffer and water. The fluorescence was then evaluated by using an LSM 510 multichannel point scanning confocal microscope (Laser 543 nm and band pass filter of 560-600 nm, magnification 20×). The settings on the instrument were kept constant for the comparison of all surfaces.

Polarized Optical Microscopy

The surfaces were imaged with a Zeiss Axioplan Compound Microscope interfaced to a high-resolution color digital camera that allowed capture of digital images (magnification 20×). Use of a range of on- and off-axis incident light beams was necessary to achieve contrast.

Atomic Force Microscopy (AFM)

The surfaces were visualized by an atomic force microscope (XE-100 microscope from PSIA). Images were obtained by scanning surfaces in a tapping mode using rectangular-shaped silicon cantilevers with a spring constant of 48 N/m. Data were then refined using the software Nanoscope. Roughness data correspond to the average Rq parameter calculated from four different whole surface areas of 20 μm×20 μm.

Evaluation of Film Stability by Mass Loss Measurement

Melt pressed films were punched with a 5 mm diameter and weighed. The films were then immersed in a vial containing 1 mL deionized water. The films were agitated at a rate of 5 rpm using a GyroTwister (Labnet International Inc.) over a period of four weeks. At the end of each week, the films were dried under vacuum at 40° C. overnight and weighed. The weight difference was plotted over time. This experiment was carried out in triplicate for each time period.

Preparation of Aqueous Dispersions/Nanoparticles from Butyl Rubber-PEO Graft Copolymers A 10 mg/mL solution of the graft copolymer was prepared in filtered THF. To this solution, filtered deionized water was added rapidly via syringe to provide solutions containing either 100%, 70%, 50%, or 30% THF. The resulting solutions were then dialyzed overnight against water using a regenerated cellulose membrane (Spectra/Por) with a molecular weight cut-off of 12000-14000 g/mol. Dynamic light scattering was performed on ZetaSizer Nano instrument from Malvern Instruments.

Transmission Electron Microscopy (TEM)

A drop of the nanoparticle suspension (~3 mg/mL) was transferred via pipette to a carbon formvar grid and was left for 1 minute. The excess solution was removed. The grid was stained with the vapour of $OsO_4$ in a sealed container, for 2 hours. Imaging was performed using a Phillips CM10 microscope operating at 80 kV with a 40 μm aperture.

Evaluation of Cell Proliferation (MTT Assay)

$C_2$-$C_{12}$ mouse fibroblast cells were cultured in growth medium composed of Dulbecco's Modified Eagle Medium (DMEM) containing 10% fetal bovine serum (FBS) and supplemented with 1% Glutamax (100×) solution and 1% Penstrep (100×). Cells were seeded onto a 96-well plate (Nunclon TC treated) at a density of $2\times10^3$ cells per well with a final volume of 100 μL of culture medium. Cells were allowed to adhere for 24 hours at 37° C. in a humidified incubator with 5% $CO_2$. After 24 hours the growth media was aspirated. Control cells were grown in growth media alone, nanoparticle samples were incubated at two-fold decreasing concentrations for 10 different concentrations from 2 mg/mL to 0.0039 mg/mL in growth media with 8 replicates at each concentration for 48 hours. All media was aspirated, then 100 μL of fresh media and 10 μL of MTT solution (5 mg/mL) was added to each well. After incubation for 4 hours, the media was aspirated and the formazan product was solubilized by addition of 50 μL of DMSO to each well. The absorbance of each well was measured at 540 nm using a plate reader (Tecan Safire).

General Reaction Schemes:

The reaction sequences used in the preparation of functionalized copolymers and grafting of such functionalized copolymers is shown below in Scheme 1:

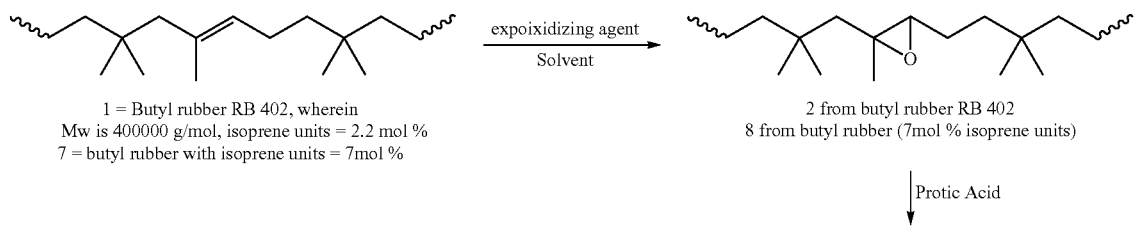

1 = Butyl rubber RB 402, wherein
Mw is 400000 g/mol, isoprene units = 2.2 mol %
7 = butyl rubber with isoprene units = 7mol %

2 from butyl rubber RB 402
8 from butyl rubber (7mol % isoprene units)

Protic Acid

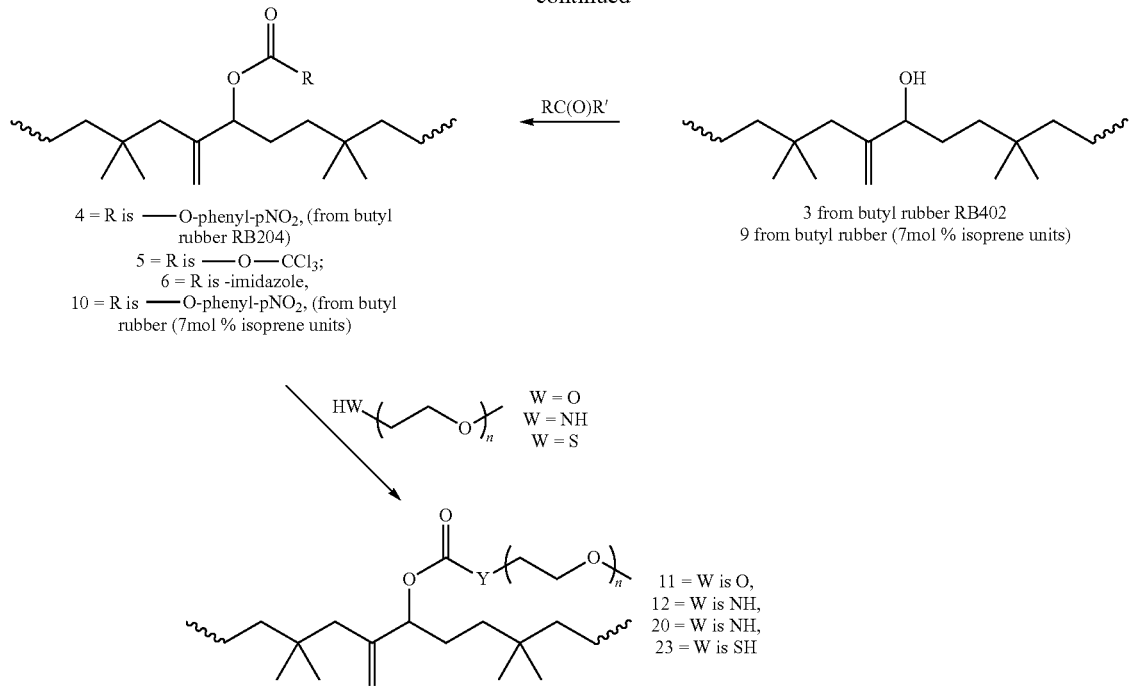

4 = R is —O-phenyl-pNO₂, (from butyl rubber RB204)
5 = R is —O—CCl₃;
6 = R is -imidazole,
10 = R is —O-phenyl-pNO₂, (from butyl rubber (7mol % isoprene units)

3 from butyl rubber RB402
9 from butyl rubber (7mol % isoprene units)

11 = W is O,
12 = W is NH,
20 = W is NH,
23 = W is SH

Example 1

Synthesis of Functionalized Copolymer (4) of Butyl Rubber RB402 a) Conversion of Butyl Rubber (1) into Epoxidized Butyl Rubber (2)

Butyl rubber RB402 (1) (11 g, 3.6 mmol of isoprene units) was dissolved in dry toluene (300 mL). A previously dried solution of meta-chloroperbenzoic acid (6.0 g in 180 mL of toluene) was added to the poly(isobutylene-co-isoprene) in solution. The resulting mixture was stirred overnight at room temperature. After evaporation of the solvent in vacuo, epoxidized butyl rubber was purified by precipitation in acetone/toluene (2:1) twice. The resulting epoxidized polymer (2) was dried under vacuum (yield 91%). $^1$H NMR (400 MHz, benzene D$_6$): δ 2.77 (t, 1H, J=5.8 Hz), 1.63 (s, CH$_2$polyisobutylene, 88H), δ 1.30 ppm (s, CH$_3$polyisobutylene, 264H). SEC: M$_w$=433000 g/mol, PDI=2.17.

b) Synthesis of Hydroxylated Butyl Rubber (3)

The epoxidized butyl rubber (2) (10 g, 3.2 mmol of epoxidized units) was dissolved in toluene (300 mL). An aqueous HCl solution (37%, 530 μL, 6.4 mmol) was added and the reaction was stirred overnight at room temperature. After evaporation of the solvent in vacuo, hydroxylated butyl rubber (3) was purified by precipitation in acetone/toluene (2:1) twice. The resulting polymer (3) was dried under vacuum (yield 90%). $^1$H NMR (400 MHz, benzene D$_o$): δ 5.40 (s, 1H), 5.00 (s, 1H), 4.05-4.09 (m, 1H), 1.63 (s, CH$_2$polyisobutylene, 88H), 1.30 (s, CH$_3$polyisobutylene, 264H). SEC: M$_w$=391200 g/mol, PDI=2.16.

c) Synthesis of 4-nitrophenyl carbonate activated butyl rubber (4)

The hydroxylated rubber (3) (3.8 g, 1.2 mmol of hydroxylated units) was dissolved in dry toluene (100 mL). 4-nitrophenyl chloroformate (4 g, 20 mmol) was added to the reaction mixture followed by pyridine dropwise (1.5 mL, 24 mmol). The reaction mixture was stirred 2 h at room temperature. Pyridine salts were then removed by filtration and the resulting solution was precipitated with acetone twice (2:1, acetone/toluene) to obtain polymer 4 (yield 87%). $^1$H NMR (400 MHz, CDCl$_3$): δ 8.28 (d, 2H, 8.5 Hz), 7.40 (d, 2H, 8.5 Hz), 5.28 (s, 1H), 5.13 (s, 1H), 5.03 (s, 1H), 1.43 (s, CH$_2$ polyisobutylene, 88H), 1.12 (s, CH$_3$ polyisobutylene, 264H). SEC: M$_w$=513900 g/mol, PDI=2.28.

Example 2

Synthesis of Functionalized Copolymer (5) of Butyl Rubber RB402

The hydroxylated butyl rubber (3) (0.3 g, 0.12 mmol of hydroxylated units, 1 eq) was dissolved in 15 mL of dry toluene. 0.17 g (0.59 mmol, 5 eq) of triphosgene was added followed by 0.19 mL (2.4 mmol, 20 eq) of freshly distilled pyridine dropwise. The mixture was stirred for either 2 hours or overnight at room temperature. The pyridine salts were then removed by means of a sintered glass funnel and the resulting solution was precipitated in acetone/toluene (2:1). The precipitation was repeated until the resulting precipitate was white, and then dried under vacuum (yield=78%).

Example 3

Synthesis of Functionalized Copolymer (6) of Butyl Rubber RB402

The hydroxylated butyl rubber (3) (0.34 g, 0.13 mmol of hydroxylated units, 1 eq) was dissolved in 20 mL of dry toluene. 0.36 g (2.21 mmol, 17 eq) of 1,1'-carbonyldiimidazole was added, followed by 0.2 mL (2.6 mmol, 20 eq) of freshly distilled pyridine dropwise. The mixture was allowed to stir for either 2 hours or 24 hours at 60° C. The pyridine salts were then removed by means of a sintered glass funnel and the resulting solution was precipitated in acetone/toluene (2:1). The precipitation was repeated until the resulting precipitate was white, and then dried under vacuum (yield=80%).

Example 4

Synthesis of Functionalized Copolymer (10) of Butyl Rubber with 7 Mol % Isoprene Units a) Synthesis of epoxidized butyl rubber (8)

Unpurified butyl rubber containing 7 mol % isoprene (0.2 g, 0.25 mmol of isoprene units) was dissolved in dry toluene (10 mL). m-Chloroperoxybenzoic acid (0.21 g, 1.25 mmol) was dissolved in 13 mL dry toluene, and then this solution was added to the rubber solution. The resulting mixture was stirred overnight at room temperature. After evaporation of the solvent in vacuo, the product was precipitated in acetone/toluene (2:1) 3 times. The resulting epoxidized rubber 8 was dried under vacuum (Yield=92%). $^1$H NMR (400 MHz, CDCl$_3$): δ 2.77 ppm (t, 1H, J=5.8 Hz), δ 1.43 (s, CH$_2$polyisobutylene, 26H), δ 1.12 ppm (s, CH$_3$polyisobutylene, 78H). SEC: M$_w$859000 g/mol, PDI=2.76.

b) Synthesis of 4-nitrophenyl carbonate activated butyl rubber (10)

Epoxidized butyl rubber 8 (0.17 g, 0.2 mmol of epoxidized units) was dissolved in dry toluene (6 mL). An aqueous HCl solution (37%, 20 µL, 0.2 mmol) was added to the epoxidized butyl rubber solution and the reaction was stirred for 1 hour at room temperature to form 9. Next, 4-nitrophenyl chloroformate (0.62 g, 3.1 mmol) was added to the reaction mixture followed by pyridine dropwise (0.30 mL, 3.6 mmol). The reaction mixture was stirred 2 hours at room temperature. Pyridine salts were then removed by filtration and the resulting solution was precipitated with acetone twice (2:1, acetone/toluene) to obtain functionalized copolymer (10) (Yield=89%). $^1$H NMR (400 MHz, CDCl$_3$): δ 8.28 (d, 2H, J=8.5 Hz), 7.40 (d, 2H, J=8.5 Hz), 5.28 (s, 1H), 5.13 ppm (s, 1H), 5.03 (s, 1H), 1.43 (s, CH$_2$polyisobutylene, 26H), 1.12 ppm (s, CH$_3$polyisobutylene, 78H). SEC: M$_w$=1013000 g/mol.

Example 5

Preparation of Graft Copolymer 11 of Butyl Rubber RB402

PEO-OH with a molecular weight of 2000 g1 mol (2.8 g, 1.4 mmol) was dissolved in dry toluene at 70° C. A solution of butyl rubber (4) (580 mg, 0.18 mmol of 4-nitrophenyl carbonates) in 10 mL of toluene was added dropwise to the reaction mixture. Then, a second solution of 4-(dimethylamino)pyridine (100 mg, 0.8 mmol) in 10 mL of toluene was added to the same reaction mixture and the resulting mixture was stirred overnight at 70° C. The solvent was then evaporated in vacuo and the mixture of polymers was washed two times with distilled water. The resulting butyl rubber was precipitated twice in CH$_2$Cl$_2$/acetone (1:10) to afford the comb-like polymer 11. $^1$H NMR (400 MHz, CDCl$_3$): $^1$H NMR (400 MHz, CDCl$_3$): δ 8.28 (d, 1.7H, 8.5 Hz), 7.40 (d, 1.7H, 8.5 Hz), 5.28 (s, 1H), 5.13 (s, 1H), 5.03 (s, 1H), 3.66 (s, 29.5H), 3.39 (s, 0.5H), 1.43 (s, CH$_2$ polyisobutylene, 88H), 1.12 (s, CH$_3$ polyisobutylene, 264H). SEC: M$_w$=188500, PDI=2.2. DSC: T$_g$=−61.3° C. T$_m$=28.6° C. 16% of the isoprene units were functionalized corresponding to a polymer comprising 8 wt % PEO.

Example 6

Preparation of Graft Copolymer 12

PEO-NH$_2$ with a molecular weight of 2000 g/mol (30 mg, 0.015 mmol) was dissolved in 10 mL of dry toluene at 60° C. A solution of the butyl rubber derivative 4 (750 mg, 0.28 mmol of 4-nitrophenylcarbonate units) in 15 mL of dry toluene was added dropwise to the reaction mixture. Next, a solution of 4-(dimethylamino)pyridine (50 mg, 0.40 mmol) in 10 mL of dry toluene was added and the resulting solution was stirred for 12 h at 60° C. The solvent was evaporated in vacuo and the rubbery solid was washed one time with distilled water. The resulting material was precipitated twice from CH$_2$Cl$_2$ into acetone (1:10) to afford the copolymer 12. (Yield=85%) $^1$H NMR: δ 8.28 (d, 1.94H, J=8.5), 7.40 (d, 1.94H, J=8.5), 5.28 (s, 0.97H), 5.22 (s, 0.03H), 5.13 (s, 0.97H), 5.12 (s, 0.03H), 5.07 (s, 0.03H), 5.03 (s, 0.97H), 4.87 (s, 0.03H), 3.66 (s, 4H), 3.39 (s, 0.1H), 1.43 (s, 88H), 1.12 (s, 264H). PEO content (from $^1$H NMR)=2 wt %; T$_g$=−66° C.; T$_m$=23° C.; M$_w$ (LS)=649±19 KDa (dn/dc=0.093 mL/g).

Graft copolymers of functionalized copolymer 4 and PEO-NH$_2$ with varying degree of PEO content were obtained by varying number of equivalents and/or molecular weight of PEO-NH$_2$ as shown in Table 1.

TABLE 1

Characterization of butyl rubber-PEO graft copolymers (prepared from butyl rubber containing 2.2 mol % isoprene).

| Copolymer | PEO-NH$_2$ MW (g/mol) | PEO-NH$_2$ equiv. | Functionalized isoprene units[a] | PEO content[b] | M$_w$ (kg/mol)[c] | T$_m$[d] |
|---|---|---|---|---|---|---|
| 12 | 2000 | 0.05 | 3% | 2 wt % | 650 ± 19 | 23° C. |
| 13 | 2000 | 0.1 | 6% | 4 wt % | 676 ± 54 | 24° C. |
| 14 | 2000 | 0.2 | 14% | 6 wt % | 660 ± 11 | 28° C. |
| 15 | 2000 | 0.4 | 32% | 12 wt % | 800 ± 38 | 31° C. |
| 16 | 2000 | 0.8 | 75% | 24 wt % | 870 ± 14 | 30° C. |
| 17 | 2000 | 1.2 | 100% | 34 wt % | 970 ± 36 | 39° C. |
| 18 | 750 | 1.2 | 100% | 18 wt % | 850 ± 34 | 12° C. |
| 19 | 5000 | 1.2 | 100% | 65 wt % | 1550 ± 380 | 59° C. |

[a]From $^1$H NMR, based on the relative integrations of the signals at 5.03 ppm and 4.87 ppm corresponding to the alkene adjacent to the activated carbonate and the PEO carbamate product respectively (see FIG. 3).
[b]From $^1$H NMR, based on the relative integrations of the signals at 3.66 ppm and at 1.43 ppm corresponding to the PEO and isobutylene units respectively.
[c]From light scattering.
[d]From DSC analysis.

Synthesis of Copolymer 13

This copolymer was prepared by the same method as described above for copolymer 12 except that 0.1 equiv. of PEO-NH$_2$ relative to the 4-nitrophenyl carbonates was used. (Yield=77%) $^1$H NMR: δ 8.28 (d, 1.88H, J=8.5), 7.40 (d, 1.88H, J=8.5), 5.28 (s, 0.94H), 5.22 (s, 0.06H), 5.13 (s, 0.94H), 5.12 (s, 0.06H), 5.07 (s, 0.06H), 5.03 (s, 0.94H), 4.87 (s, 0.06H), 3.66 (s, 8H), 3.39 (s, 0.16H), 1.43 ppm (s, 88H), 1.12 (s, 264H). PEO content (from $^1$H NMR)=4 wt %; $T_g$=−67° C.; $T_m$=24° C.; $M_w$(LS)=676±54 KDa (dn/dc=0.084 mug).

Synthesis of Copolymer 14

This copolymer was prepared by the same method as described above for copolymer 12 except that 0.2 equiv. of PEO-NH$_2$ relative to the 4-nitrophenyl carbonates was used. (Yield=76%) $^1$H NMR: δ 8.28 (d, 1.7H, J=8.5), 7.40 (d, 1.7H, J=8.5), 5.28 (s, 0.86H), 5.22 (s, 0.14H), 5.13 (s, 0.86H), 5.12 (s, 0.14H), 5.07 (s, 0.14H), 5.03 (s, 0.86H), 4.87 (s, 0.14H), 3.66 (s, 13H), 3.39 (s, 0.25H), 1.43 (s, 88H), 1.12 (s, 264H). PEO content (from $^1$H NMR)=6 wt %; $T_g$=−62° C.; $T_m$=28° C.; $M_w$(LS)=657±11 KDa (dn/dc=0.070 mL/g).

Synthesis of Copolymer 15

This copolymer was prepared by the same method as described above for copolymer 12 except that 0.4 equiv. of PEO-NH$_2$ relative to the 4-nitrophenyl carbonates was used. (Yield=60%) $^1$H NMR: δ 8.28 (d, 1.32H, J=8.5), 7.40 (d, 1.32H, J=8.5), 5.28 (s, 0.68H), 5.22 (s, 0.32H), 5.13 (s, 0.68H), 5.12 (s, 0.32H), 5.07 (s, 0.32H), 5.03 (s, 0.68H), 4.87 (s, 0.32H), 3.66 (s, 30H), 3.39 (s, 0.6H), 1.43 (s, 88H), 1.12 (s, 264H). PEO content (from $^1$H NMR): 12 wt %; $T_g$=−71° C.; $T_m$=31° C.; $M_w$(LS)=803±38 KDa (dn/dc=0.070 mL/g).

Synthesis of Copolymer 16

This copolymer was prepared by the same method as described above for copolymer 12 except that 0.8 equiv. of PEO-NH$_2$ relative to the 4-nitrophenyl carbonates was used. (Yield=51%) $^1$H NMR: δ 8.28 (d, 0.5H, J=8.5 Hz), 7.40 (d, 0.5H, J=8.5), 5.28 (s, 0.25H), 5.22 (s, 0.75H), 5.13 (s, 0.25H), 5.12 (s, 0.75H), 5.07 (s, 0.75H), 5.03 (s, 0.25H), 4.87 (s, 0.75H), 3.66 (s, 70H), 3.39 (s, 1.4H), 1.43 (s, 88H), 1.12 (s, 264H). PEO content (from $^1$H NMR): 24 wt %; $T_g$=−69° C.; $T_m$=30° C.; $M_w$(LS)=872±14 KDa (dn/dc=0.065 mL/g).

Synthesis of Copolymer 17

This copolymer was prepared by the same method as described above for copolymer 12 except that 1.2 equiv. of PEO-NH$_2$ relative to the 4-nitrophenyl carbonates was used and the resulting copolymer was purified by precipitation twice from THF into H$_2$O (1:2). (Yield=49%)$^1$H NMR: δ5.22 (s, 1H), 5.12 (s, 1H), 5.07 (s, 1H), 4.87 (s, 1H), 3.66 (s, 115H), 3.39 (s, 2.4H), 1.43 (s, 88H), 1.12 (s, 264H). PEO content (from $^1$H NMR): 34 wt %; $T_g$=−62° C.; $T_m$=39° C.; $M_w$(LS)=971±36 KDa (dn/dc=0.050 mL/g).

Synthesis of Copolymer 18

This copolymer was prepared by the same method as described above for copolymer 12 except that 1.2 equiv. of PEO-NH$_2$ of a molecular weight of 750 g/mol relative to the 4-nitrophenyl carbonates was used. (Yield=75%) $^1$H NMR: δ 5.22 (s, 1H), 5.12 (s, 1H), 5.07 (s, 1H), 4.87 (s, 1H), 3.66 (s, 49H), 3.39 (s, 2.6H), 1.43 ppm (s, 88H), 1.12 (s, 264H). PEO content (from $^1$H NMR): 18 wt %; $T_2$=−64° C.; $T_m$=12° C.; $M_w$(LS)=849±34 KDa (dn/dc=0.060 mL/g).

Synthesis of Copolymer 19

This copolymer was prepared by the same method as described above for copolymer 12 except that 1.2 equiv. of PEO-NH$_2$ of a molecular weight of 5000 g/mol relative to the 4-nitrophenyl carbonates was used and the resulting copolymer was purified by precipitation twice from THF into H$_2$O (1:2). (Yield=70%)$^1$H NMR: δ 5.22 (s, 1H), 5.12 (s, 1H), 5.07 (s, 1H), 4.87 (s, 1H), 3.66 (s, 295H), 3.39 (s, 2.4H), 1.43 (s, 88H), 1.12 (s, 264H). PEO content (from $^1$H NMR): 65 wt %; $T_m$=59° C.; $M_w$(LS)=1550±380 KDa (dn/dc=0.055 mL/g).

Example 6

Synthesis of Graft Copolymer 20 of "Butyl Rubber with 7 Mol % Isoprene Units"

PEO-NH$_2$ with a molecular weight of 750 g/mol (1.2 g, 1.6 mmol) was dissolved in dry toluene (30 mL). In a separate flask, activated butyl rubber (10) (1.3 g, 1.3 mmol) was dissolved in dry toluene (20 mL) and was then added to the reaction mixture dropwise. Next, 4-dimethylaminopyridine (0.24 g, 2.0 mmol) was dissolved in 10 mL of dry toluene and the solution was added to the same reaction mixture. The resulting mixture was stirred overnight at 60° C. The solvent was removed in vacuo and the resulting rubbery solid was washed once with deionized water and then purified by precipitation from THF/water (1:10). (Yield=70%); $^1$H NMR (400 MHz, CDCl$_3$): 5.20 (s, 1H), 5.12 (s, 1H), 5.06 (s, 1H), 4.87 (s, 1H), 3.65 (s, 44H), 3.38 (s, 2.4H), 1.41 (s, 26H), 1.11 (s, 78). PEO content (from $^1$H NMR): 40 wt %; Mw (LS)=530±20 KDa (using dn/dc=0.055 mL/g), DSC: Tg=−58° C.; $T_m$=21° C.

Graft copolymers of functionalized polymer 10 and PEO-NH$_2$ with varying degree of PEO content were obtained by varying the molecular weight of PEO-NH$_2$ as shown in Table 2.

TABLE 2

Characterization of butyl rubber-PEO graft copolymers prepared from Butyl rubber containing 7 mol % isoprene.

| Copolymer | PEO-NH$_2$ MW (g/mol) | PEO-NH$_2$ equiv. | Functionalized isoprene units[a] | PEO content[b] | $M_w$ (kg/mol)[c] | $T_m$[d] |
|---|---|---|---|---|---|---|
| 20 | 750 | 1.2 | 100% | 40 wt % | 530 ± 20 | 20° C. |
| 21 | 2000 | 1.2 | 100% | 60 wt % | 1740 ± 20 | 44° C. |
| 22 | 5000 | 1.2 | 100% | 92 wt % | 5040 ± 670 | 60° C. |

[a]From $^1$H NMR, based on the relative integrations of the signals at 5.03 ppm and 4.87 ppm corresponding to the alkene adjacent to the activated carbonate and the PEO carbamate product respectively.
[b]From $^1$H NMR, based on the relative integrations of the signals at 3.66 ppm and at 1.43 ppm corresponding to the PEO and isobutylene units respectively.
[c]From light scattering.
[d]From DSC analysis.

Synthesis of Copolymer 21

This copolymer was prepared by the same procedure described above for copolymer 20, except that PEO-NH$_2$ with a molecular weight of 2000 g/mol was used and the resulting copolymer was purified by precipitation from THF/diethyl ether (1:10). (Yield=69%) $^1$H NMR (400 MHz, CDCl$_3$): 5.20 (s, 1H), 5.12 (s, 1H), 5.06 (s, 1H), 4.87 (s, 1H), 3.65 (s, 100H), 3.38 (s, 2.6H), 1.41 (s, 26H), 1.11 (s, 78). PEO content (from $^1$H NMR): 60 wt %; $M_w$ (LS)=1740±20 KDa (using dn/dc=0.055 mL/g), DSC: $T_g$=−56° C.; $T_m$=44° C.

Synthesis of Copolymer 22

This copolymer was prepared by the same procedure described above for copolymer 21, except that PEO-NH$_2$ with a molecular weight of 5000 g/mol was used. (Yield=86%). $^1$H NMR (400 MHz, CDCl$_3$): 5.20 (s, 1H), 5.12 (s, 1H), 5.06 (s, 1H), 4.87 (s, 1H), 3.65 (s, 812H), 3.38 (s, 3H), 1.41 (s, 26H), 1.11 (s, 78). M$_w$ (LS)=5040±670 KDa (using dn/dc=0.055 mL/g), DSC: T$_m$=60° C.

Example 7

Synthesis of Graft Copolymer 23

This copolymer was prepared by the same method as described above for copolymer 12 except that THF was used instead of toluene and 1.2 equiv. of PEO-SH (having molecular weight of 1000 g/mol) relative to the 4-nitrophenyl carbonates was used. The resulting copolymer was purified by precipitation twice from THF into H$_2$O (1:2). (Yield=70%). $^1$H NMR: 5.24 (s, 1H), 5.16 (s, 1H), 4.93 (s, 1H), 3.06 (t, 1H), 3.66 (s, 46H), 3.39 (s, 1.4H), 1.42 (s, 26H), 1.11 (s, 78H). PEO content (from $^1$H NMR): 41 wt %; Mw (LS)=1500±190 kDa (dn/dc=0.115 mL/g).

Example 7

Characterization of Grafted Copolymers

Figure 3:
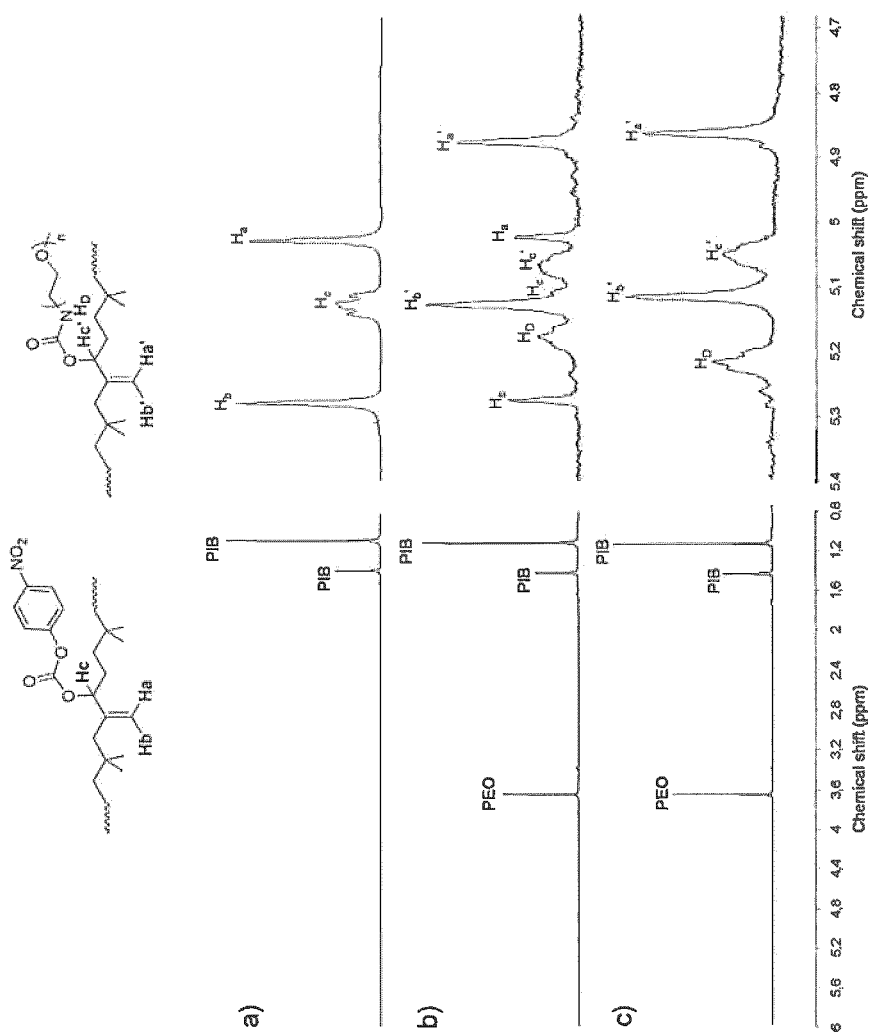
FIG. 3 shows ¹H NMR spectra (CDCl₃, 400 MHz) of a) activated butyl rubber 4; b) copolymer 16; c) copolymer 17 illustrating determination of PEO content from the relative intensities of the PEO and PIB peaks.

After removal of unconjugated PEO from the graft copolymer products by precipitation in acetone or water, the graft copolymers were characterized by $^1$H NMR spectroscopy, differential scanning calorimetry (DSC), size exclusion chromatography (SEC), and light scattering. Following conjugation of the PEO-NH$_2$ and thus conversion of the activated carbonates to carbamates, the $^1$H NMR peaks corresponding to the exo alkene and the C—H in the α-position to the activated carbonate in the region from 4.5 to 5.5 ppm were observed to shift significantly as shown in FIG. 3. This allowed for quantification of the percentage of functionalized isoprene units (FIG. 3, Table 1). In addition, the $^1$H NMR integrations of the peaks corresponding to the PEO at 3.66 ppm and the polyisobutylene units at 1.43 ppm were compared to estimate the PEO content (FIG. 3). In particular, FIG. 3 illustrates $^1$H NMR spectra (CDCl$_3$, 400 MHz) of a) activated butyl rubber 4; b) copolymer 16; c) copolymer 17 showing how PEO content can be determined from the relative intensities of the PEO and PIB peaks and the reaction conversion can be assessed from the peaks in the region of 4.7-5.3 ppm.

Example 8

Thermal Properties of Grafted Copolymers

The thermal properties of copolymers 12-19 were measured by DSC analyses. PEO homopolymer of 2000 g/mol is crystalline with a melting temperature (T$_m$) of 58° C., whereas butyl rubber is noncrystalline with a glass transition temperature (T$_g$) of −73° C. (supporting info). Despite the widely varying PEO content of copolymers 12-19, no significant changes or trends in the T$_g$s were observed. In contrast, the T$_m$ of the PEO was significantly reduced by incorporation into the graft copolymers (Table 1). At low PEO content, the T$_m$ was much lower than the T$_m$ of pure PEO of the same molecular weight. For example, copolymer 12 containing only 2 wt % PEO had a T$_m$ of only 23° C. However, the T$_m$ increased with increasing PEO content up to 39° C. for copolymer 19, containing 34 wt % PEO. The highest T$_m$ of 59° C. was measured for copolymer 19, which had 100% of the isoprene units functionalized with PEO of 5000 g/mol. This T$_m$ was very similar to the T$_m$ of 61° C. for the corresponding PEO homopolymer. The lowest T$_m$ of 12° C. was measured for polymer 18, which contained 100% of the isoprene units functionalized with PEO of 750 g/mol. This low T$_m$ is not surprising in light of the T$_m$ of 22° C. for the corresponding PEO homopolymer. Overall, these results suggest that the presence of higher PEO content and higher PEO MW results in higher T$_m$ likely due to the ability of these copolymers to form larger PEO domains which possess crystallinities more similar to those of pure PEO. These DSC results were also useful in confirming the absence of unconjugated PEO in the graft copolymers. The presence of free PEO in unpurified samples of the graft copolymers leads to an additional melting peak at the temperature expected for the corresponding PEO homopolymer. This extra melting peak was not observed in the DSC traces of any of the purified polymers 12-19.

The M$_w$s of the graft copolymers were determined by light scattering analyses in the absence of a column. First, the differential refractive index increment (dn/dc) was measured for each polymer in THF using a refractive index detector, and then the time averaged light scattering intensities for each polymer were measured as a function of concentration and their molecular weights were determined using a Debye plot. As shown in Table 1, the M$_w$s measured by this method increased as expected with increasing PEO content. For example, copolymer 12 containing 2 wt % PEO was found to have a M$_w$ of 649 KDa, while copolymer 17 containing 34 wt % PEO had a M$_w$ of 971 KDa. Because of the nature of the light scattering technique, these data should reflect the true M$_w$s of the samples in contrast to those determined by relative calibrations, which more closely reflect the hydrodynamic size and can be influenced by other effects such as interactions with the column.

Example 9

Resistance to Protein Adsorption

Figure 4:
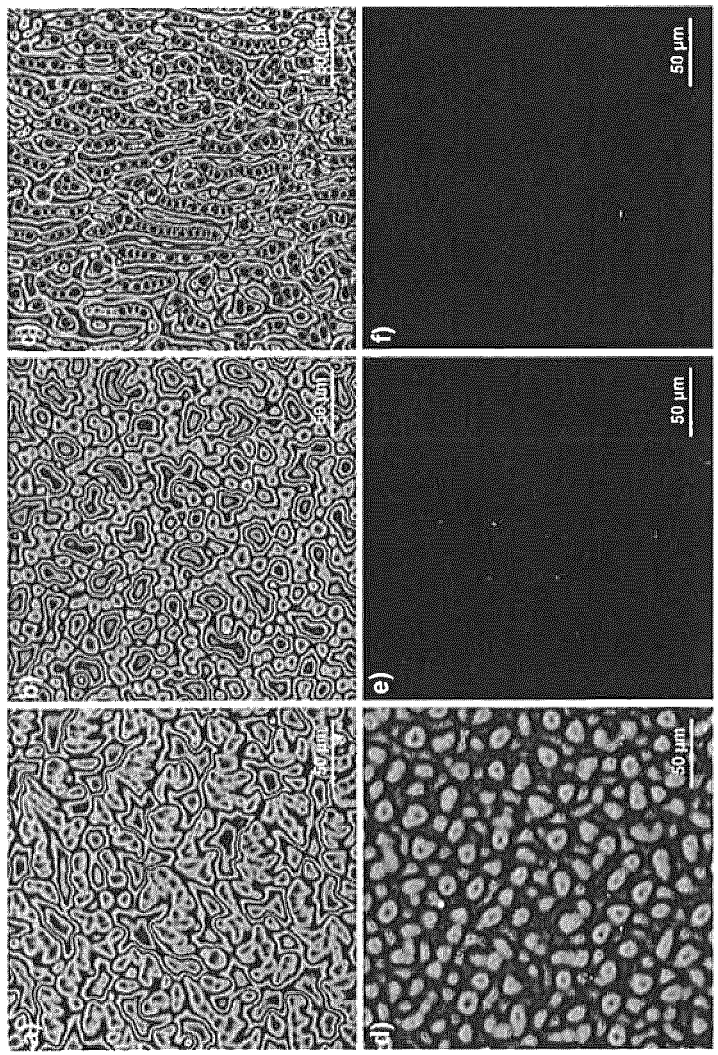
FIG. 4 shows fluorescence confocal microscopy images (543 nm) of thin films (spin-cast at 20 mg/mL from CH₂Cl₂) following adsorption of a rhodamine-fibrinogen conjuguate. a) copolymer 12; b) copolymer 13; c) copolymer 14; d) copolymer 15; e) copolymer 16; f) copolymer 17.
Figure 5:
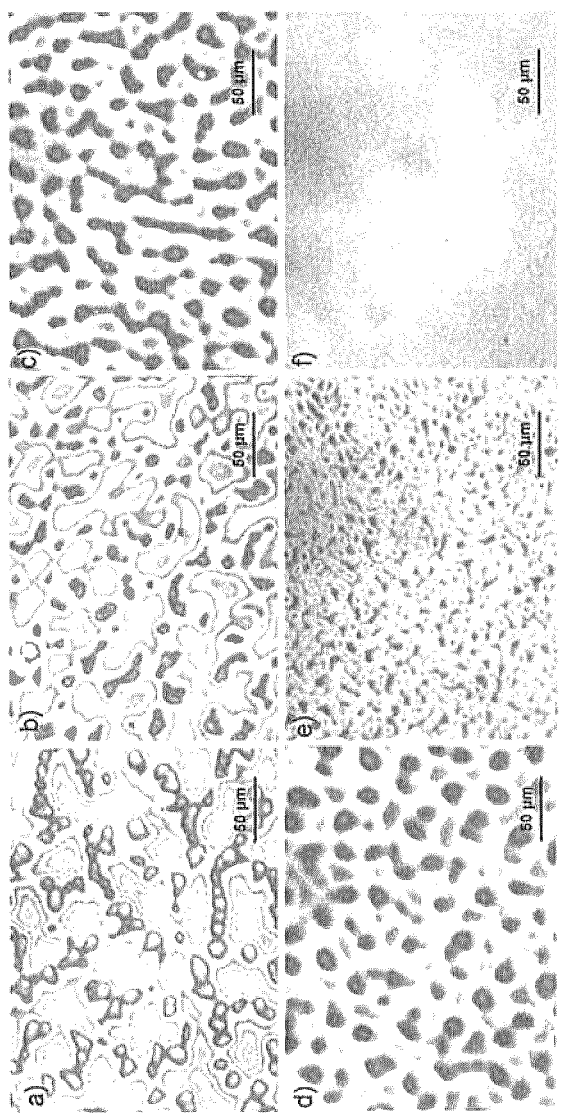
FIG. 5 shows polarized optical microscopy images of thin films of graft copolymers spin-cast from CH₂Cl₂ (20 mg/mL): a) copolymer 12; b) copolymer 13; c) copolymer 14; d) copolymer 15; e) copolymer 16; f) copolymer 17.
Figure 6:
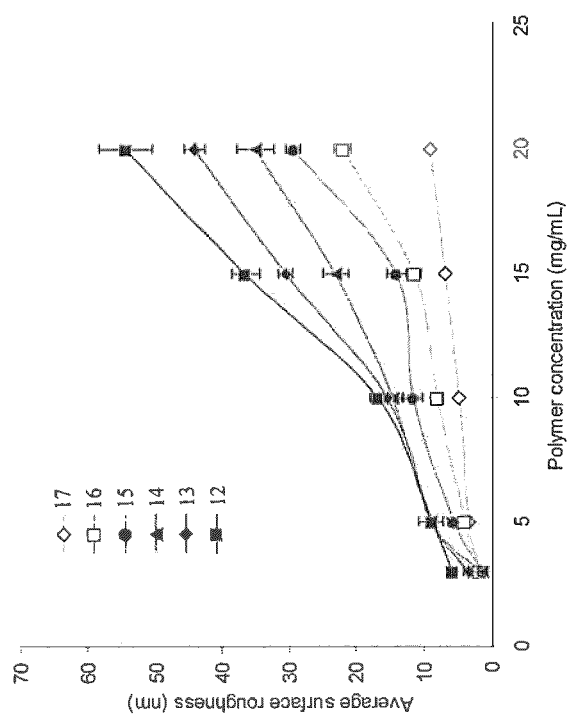
FIG. 6 shows average surface roughness values for thin films prepared from polymers 12-17 as a function of concentration, obtained from an AFM analysis.

Thin films of copolymers 12-17 were prepared by spin-casting CH$_2$Cl$_2$ solutions with concentrations of 10-20 mg/mL on clean silicon wafers. The surfaces were imaged by fluorescence confocal microscopy following immersion in a solution of rhodamine-labeled fibrinogen,[56] a protein commonly evaluated in protein adsorption studies.[57] The results from these studies are illustrated in FIGS. 4 to 6. FIG. 4 shows Fluorescence confocal microscopy images (543 nm) of thin films (spin-cast at 20 mg/mL from CH$_2$Cl$_2$) following adsorption of a rhodamine-fibrinogen conjuguate. a) copolymer 12; b) copolymer 13; c) copolymer 14; d) copolymer 15; e) copolymer 16; f) copolymer 17. FIG. 5 relates to Polarized optical microscopy images of thin films of graft copolymers spin-cast from CH$_2$Cl$_2$ (20 mg/mL): a) copolymer 12; b) copolymer 13; c) copolymer 14; d) copolymer 15; e) copolymer 16; f) copolymer 17, and FIG. 6 relates to Average surface roughness values for thin films prepared from polymers 12-17 as a function of concentration, obtained from an AFM analyses.

Figure 7:
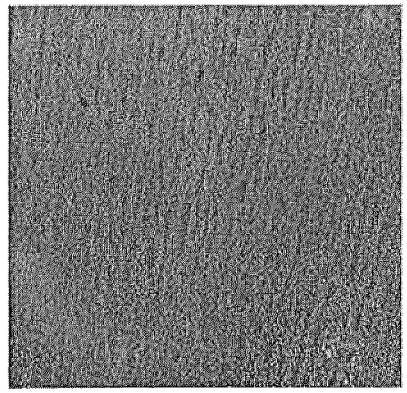
FIG. 7 shows fluorescence confocal microscopy image (543 nm) of a thin film of butyl rubber (spin cast from an hexane) following adsorption of a rhodamine-fibrinogen conjuguate.

As shown in FIG. 4, at PEO content less than 24 wt %, complex patterns of protein adsorption were observed. However, for copolymers 16 and 17 containing 24 wt % and 34 wt % PEO, negligible protein was detected on the surface indicating that this PEO content was sufficient to obtain resistance to protein adsorption. The protein adsorption was found to correlate with the formation of micrometer scale patterns on the films that were also observed by polarized optical microscopy (FIG. 5), and surface roughness that was measured by atomic force microscopy (FIG. 6). Based on these data, the surfaces containing higher PEO content that resisted the adsorption of proteins exhibited little to no micrometer scale patterning and low surface roughness. These results indicate that the surfaces prepared from these copolymers are capable of presenting sufficient amounts of PEO at the surface to repel proteins. FIG. 7 shows fluorescence confocal microscopy image (543 nm) of a thin film of butyl rubber (spin cast from an hexane) following adsorption of a rhodamine-fibrinogen conjuguate. The image reveals relatively homogeneous protein adsorption.

Figure 15:
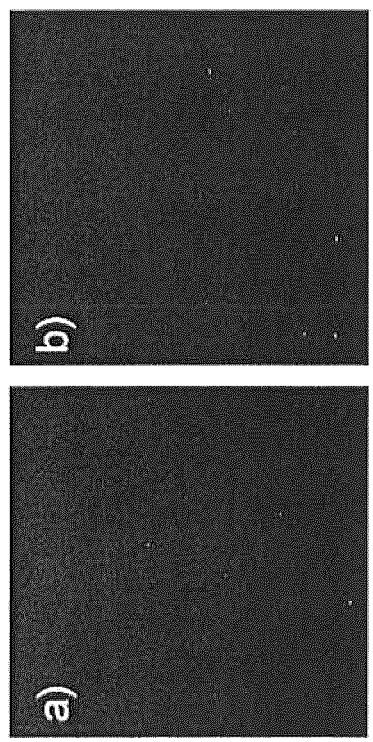
FIG. 15 shows fluorescence confocal microscopy images (543 nm) of thin films (spin-cast from CH₂Cl₂) following adsorption of a rhodamine-fibrinogen conjuguate. a) copolymer 18 (20 mg/mL); b) copolymer 19 (20 mg/mL).

While the above study evaluated the effect of PEO content while keeping the PEO MW constant at 2000 g/mol, the effects of PEO MW by comparing thin films prepared from copolymers 18 and 19 with those from copolymer 17 was also investigated. Films were also prepared from these polymers by spin-casting $CH_2Cl_2$ solutions with concentrations of 10-20 mg/mL on clean silicon wafers. As for copolymer 17, no significant protein adsorption was observed for polymers 18 and 19 (FIG. 15). These results suggest that the lower limit of PEO content required for resistance to protein adsorption depends on the MW of the grafted PEO. Overall, high grafting, yields (75% or higher functionalization of the isoprene units) are critical for this resistance and the above reported synthetic method is critical for obtaining these high yields as they have not been achieved in previous work. These results suggest the utility of these polymers in biomedical applications. The fouling of biomedical devices via protein adsorption is a serious limitation for many materials. This protein resistant property may make these materials useful for a wide range of medical devices such as stent and catheter coatings, drug delivering films, and implants.

Example 10

Stability of Films

Figure 8:
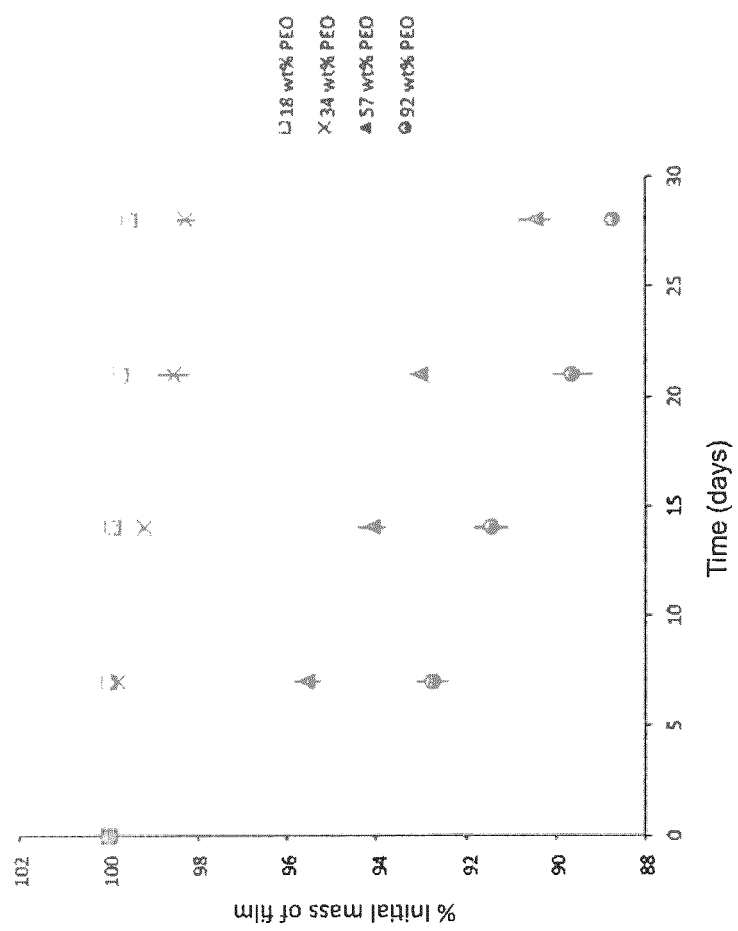
FIG. 8 shows mass loss from films from copolymers 17, 18, 19, and 22 upon incubation in water at 25° C.

As described above, one of the potential applications of these graft copolymers is their use as coatings. While the above films were prepared by spin-casting, it was also possible to prepare films by drop-casting or melt pressing. Despite having high PEO content and the high aqueous solubility of PEO, these films did not dissolve in aqueous solution. This can likely be attributed to physical cross-links maintained by the hydrophobic butyl rubber segments. The mass loss from melt pressed films generated from copolymers 17, 18, 19, and 22 was studied over a period of 1 month. As shown in FIG. 8, It was found that very minimal weight loss was observed over this time period. This demonstrates the stability of these materials as films over this period which would make these materials directly suitable for applications such as catheter coatings and drug delivering coatings.

Figure 9:
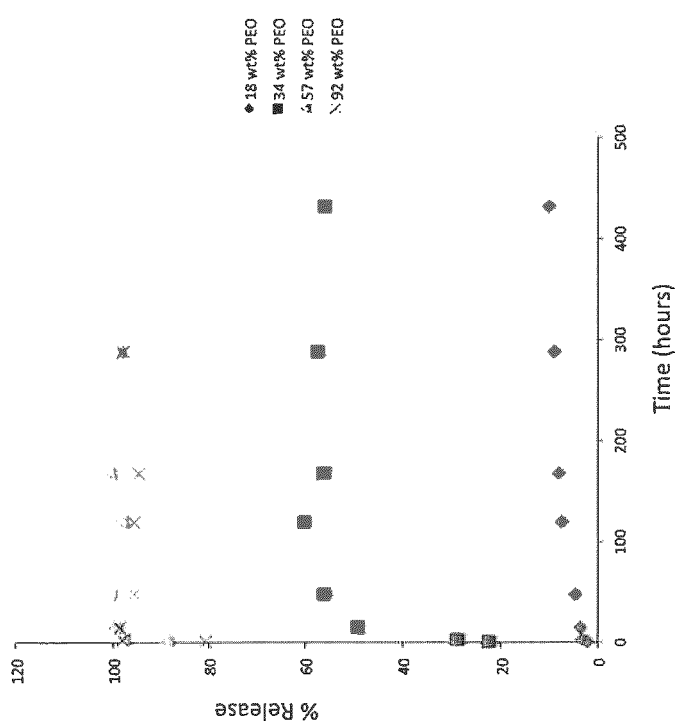
FIG. 9 shows release of a rhodamine dye from films prepared from copolymers containing varying PEO content.

To investigate further the ability of the materials to encapsulate and slowly release a payload, a small molecule rhodamine dye was encapsulated and its release into phosphate buffer was investigated. A 35 mg/mL solution of each copolymer was prepared. Added to these solutions was a 1.4 mMRhodamine B. The solution was then drop cast onto a glass slide (3 coats of 100 μL each). The films were then dried under vacuum. Drop cast films were then submerged in a PBS buffer solution (pH=7.4) with 0.1% $NaN_3$ and placed on shaker. The quantity of released dye was determined by UV-visible measurements carried out using a Cary Bio 300 UV spectrophotometer with max absorbance being measured at 550 nm. FIG. 9 relates to release of a rhodamine dye from films prepared from copolymers containing varying PEO content. As shown in FIG. 9, the release rate could be tuned based on the PEO content, again demonstrating the importance of controlling the PEO content through our process.

Example 11

Aqueous Solution Behaviour of the Butyl Rubber-PEO Graft Copolymers

Figure 10:
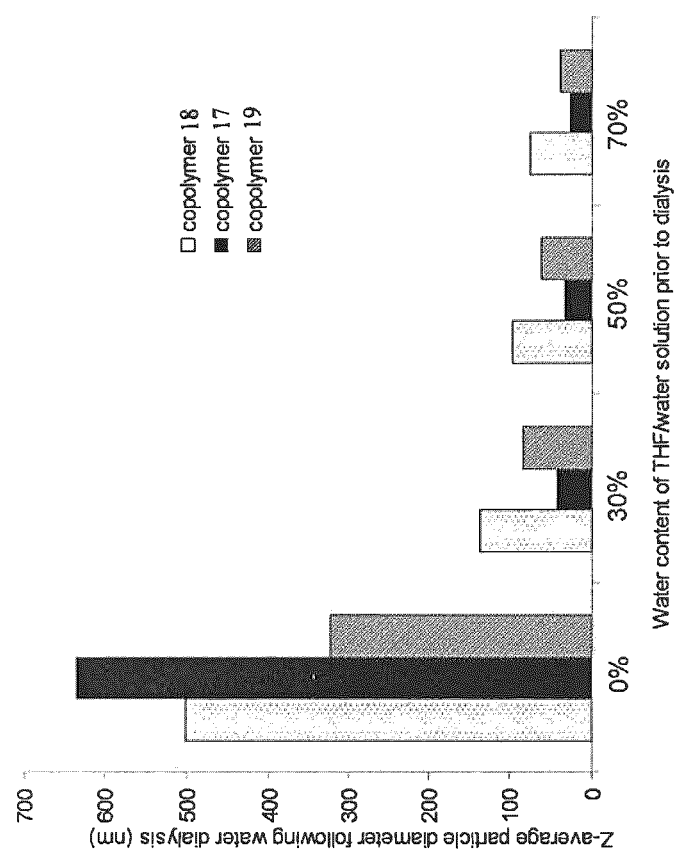
FIG. 10 shows Z-average sizes of particles formed by copolymers 17, 18, and 19 via following aqueous dialysis of a solution of polymer in THF as a function of the percentage of water added rapidly to the THF solution prior to dialysis.

The butyl rubber-PEO graft copolymers do not directly dissolve in water, even at high PEO content. However, by first dissolving the polymers in THF and then changing the solvent to water, stable dispersions of nanosized particles were obtained. Such aqueous dispersions of amphiphilic polymers are of significant interest as carriers of drugs and imaging contrast agents. They may also be useful as a formulation for the generation of polymer coatings via a method analogous to latex paints. The sizes of these particles could be controlled by their method of preparation. This is of interest as size will affect the biodistribution behavior of the materials in vivo and thus their potential delivery applications. It may also affect the properties of coatings generated from the latex. When a THF solution of copolymer was directly dialyzed against water, particles with Z-average diameters on the order of several hundred nm were formed for copolymers 17, 18, and 19, as measured by dynamic light scattering (DLS) (FIG. 10). In contrast, when water was added rapidly to the THF solution prior to dialysis against water, nanoparticles with Z-average diameters on the order of 100 nm or less were formed. The more water added prior to the dialysis, the smaller the resulting nanoparticles. This may be attributed to the kinetic trapping of smaller aggregates or even unimolecular micelles upon the rapid addition of water, whereas the gradual addition of water by dialysis alone results in the gradual aggregation of many copolymers to form larger aggregates. FIG. 10 illustrates Z-average sizes of particles formed by copolymers 17, 18, and 19 via following aqueous dialysis of a solution of polymer in THF as a function of the percentage of water added rapidly to the THF solution prior to dialysis.

Figure 11:
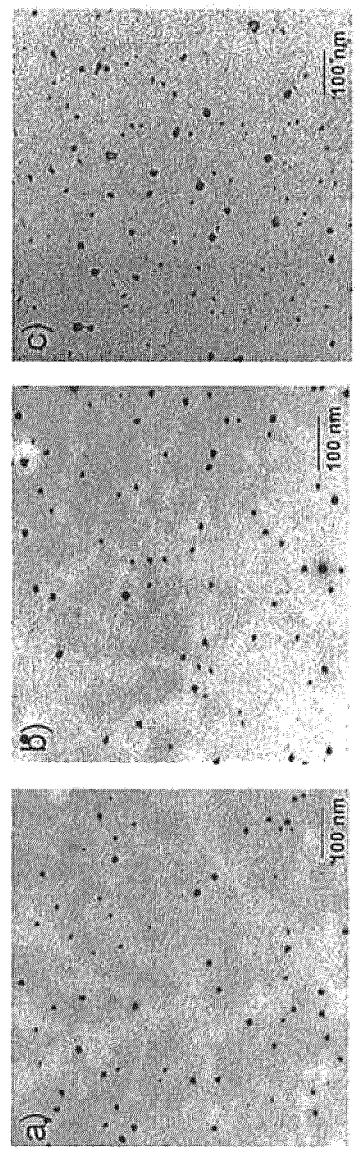
FIG. 11 shows TEM images of nanoparticles formed by addition of 70% water to a THF solution of copolymer, followed by dialysis against water: a) copolymer 17; b) copolymer 18; c) copolymer 19.

The presence of these nanoparticles and their sizes were also verified by transmission electron microscopy with staining of the butyl rubber isoprene units using $OsO_4$. The sizes were in good agreement with those measured by DLS considering that the PEO coronas of the nanoparticles would not be visualized by TEM (FIG. 11). FIG. 11 shows TEM images of nanoparticles formed by addition of 70% water to a THF solution of copolymer, followed by dialysis against water: a) copolymer 17; b) copolymer 18; c) copolymer 19. The particle sizes remained unchanged after several months indicating that the aqueous dispersions were stable.

In addition, it was demonstrated using copolymer 18 as an example, that a model hydrophobic molecule Nile Red, could be encapsulated in the nanoparticies.

Nile Red Encapsulation 10 mg of copolymer 18 was dissolved in 1 mL of THF. To 0.3 mL of this solution was added 0.5 mg of solid Nile Red followed by a rapid addition of 0.7 mL of deionized water. The resulting solution was mixed thoroughly and then dialyzed against water overnight. A control sample of Nile Red in water was prepared by sonicating 0.5 mg of Nile Red in deionized water. The fluorescence of each sample was obtained on a QM-4 SE spectrofluorometer equipped with double excitation and emission monochromators from Photon Technologies International. An excitation wavelength of 485 inn was used for Nile Red and the emission spectra were recorded from 520 and 700 nm.

Figure 12:
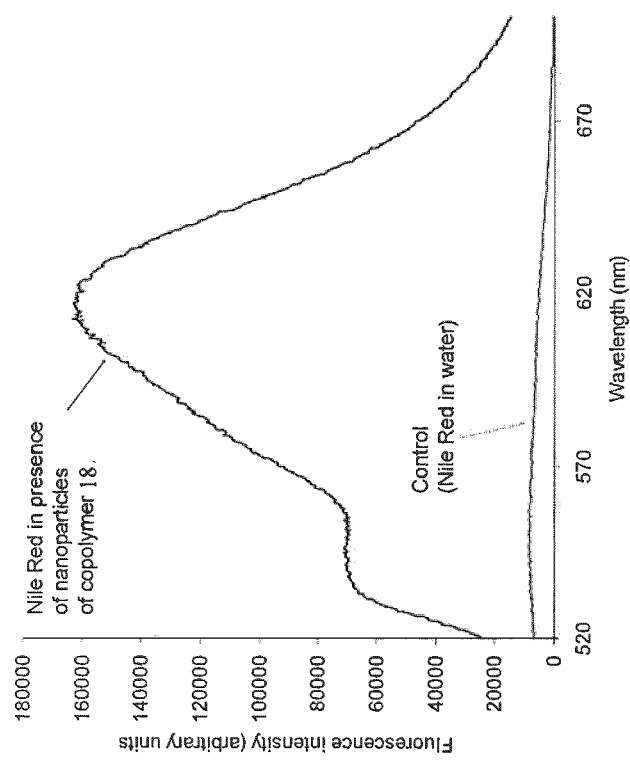
FIG. 12 shows the fluorescence of the hydrophobic dye Nile Red in the presence of nanoparticles assembled from copolymer 18, demonstrating its encapsulation.

This encapsulation was verified by fluorescence spectroscopy (FIG. 12) as Nile Red has negligible fluorescence in aqueous solution alone, but its fluorescence is known to increase significantly upon incorporation into the hydrophobic interiors of polymer assemblies. FIG. 12 shows that the fluorescence of the hydrophobic dye Nile Red is increased in the presence of nanoparticles assembled from copolymer 18.

Figure 13:
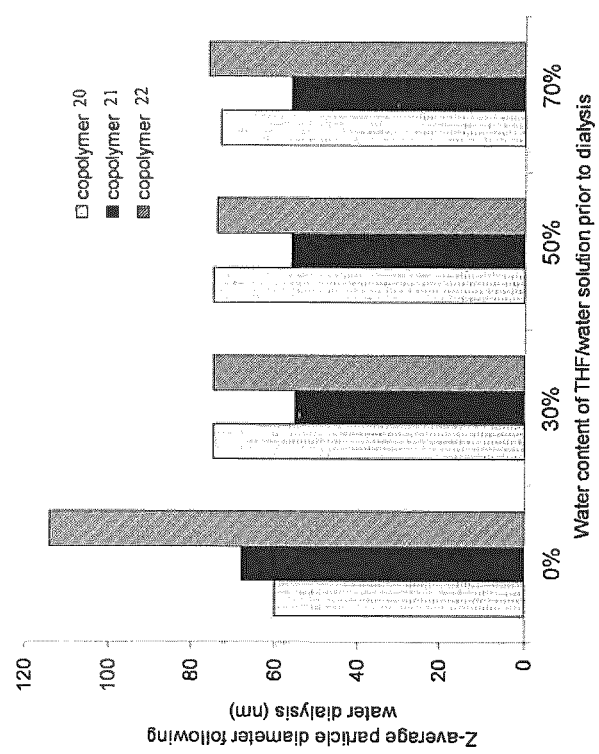
FIG. 13 shows Z-average sizes of particles formed by copolymers 20, 21, and 22 following aqueous dialysis of a solution of polymer in THF as a function of the percentage of water added rapidly to the THF solution prior to dialysis.

The formation of aqueous dispersions of copolymers 20, 21, and 22, prepared from the high isoprene content (butyl rubber with 7 mol % isoprene units) was also investigated. FIG. 13 shows Z-average sizes of particles formed by copolymers 20, 21, and 22 following aqueous dialysis of a solution of polymer in THF as a function of the percentage of water added rapidly to the THF solution prior to dialysis.

These materials also formed nanosized particles in water by the same methods described above (FIG. 13). In this case, the sizes of the particles was not dependent on the rate of water addition. This may be attributed to their high PEO content, which is sufficient to stabilize small assemblies in all cases.

Figure 14:
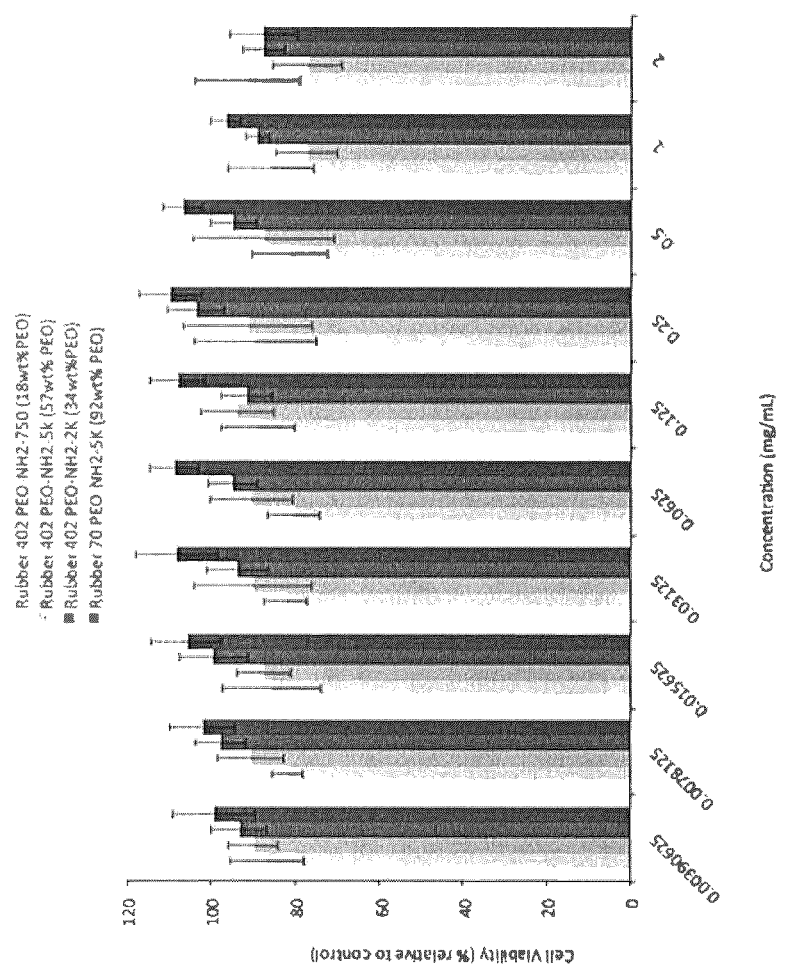
FIG. 14 shows viability of C2C12 cells exposed to varying concentrations of copolymers with different PEO content, measured using the MTT assay, relative to control cells not exposed to copolymer (cell viability=1)

The toxicities of the nanoparticles was investigated in C2C12 mouse myoblast cells using an MTT assay. FIG. 14 illustrates Viability of C2C12 cells exposed to varying concentrations of copolymers with different PEO content, measured using the MTT assay, relative to control cells not exposed to copolymer (cell viability=1). No significant changes in the proliferation of the cells were detected for any of the evaluated polymers relative to control cells that were not exposed to any polymer (FIG. 14). This suggests that the new materials described here are nontoxic, again suggesting their suitability for biomedical applications in the form of the above described films or nanoparticles.

All documents cited in the Detailed Description of the invention are, in relevant par, incorporated herein by reference; the citation of any document is not to be construed as an admission that it is prior art with respect to the present invention.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method of functionalizing a copolymer comprising repeating units derived from at least one C4-C8 isoolefin and repeating units derived from at least one C4-C16 conjugated diolefin, the method comprising:
    converting one or more C—C double bonds of the repeating units derived from the isoolefins into one or more allylic hydroxyl sites; and
    reacting the one or more allylic hydroxyl sites with an activating reagent having the formula:

R—C(O)—R' to convert one or more hydroxyl groups of the allylic hydroxyl sites into —OC(O)—R functional groups represented by:

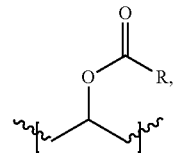

wherein R and R' are each independently:

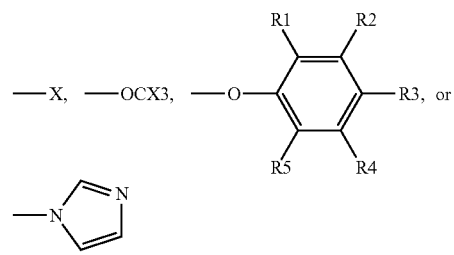

wherein X is halogen, and R1 to R5 are each independently H, NO$_2$, halogen, or C1-C6 alkyl.

2. The method of claim 1, wherein the step of converting the one or more C—C double bonds into the one or more allylic sites comprises:
    epoxidizing the one or more C—C double bonds to produce an epoxidized copolymer having epoxidized C—C double bonds, and
    reacting the resulting epoxidized copolymer with a protic acid to convert the one or more epoxidized C—C double bonds into the one or more allylic hydroxyl sites.

3. The method of claim 2, wherein the protic acid is HCl, HBr, HF, H$_2$SO$_4$, HNO$_3$ or CF$_3$COOH.

4. The method of claim 1, wherein the copolymer has a weight average molecular weight of about 250,000 to about 1,500,000 g/mol.

5. The method of claim 1, wherein the copolymer comprises from about as to about 20 mol % of the units derived from conjugated diolefin and about 80 to 995 mol % of the units derived from isoolefin.

6. The method of claim 1, wherein the C—C double bond is part of an isoprene unit represented by the formula:

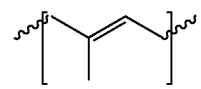

wherein one or more of the isoprene units are converted into allylic hydroxide containing isoprene units containing the one or more allylic hydroxyl sites, represented by the formula:

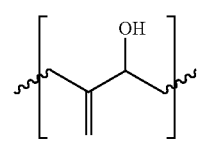

wherein one or more of the allylic hydroxide containing isoprene units are converted into one or more functionalized isoprene units represented by the formula:

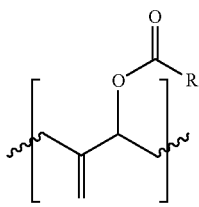

wherein R is as defined above.

7. The method of claim 1, wherein the isoolefin comprises isobutylene.

8. A functionalized copolymer comprising:
repeating units derived from at least one C4-C8 isoolefin; and
repeating units derived from at least one C4-C16 conjugated diolefin, wherein one or more of the units derived from the at least one conjugated diolefin are functionalized with a group —OC(O)—R represented by the formula;

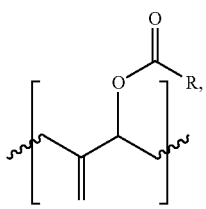

wherein R is a leaving group which is:

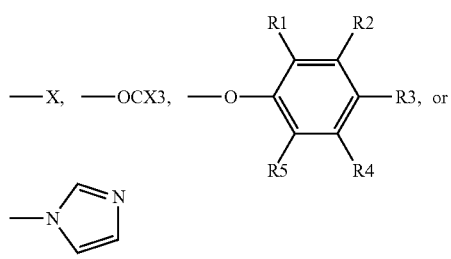

wherein X is halogen, and R1 to R5 are each independently H, NO$_2$, halogen, or C1-C6 alkyl.

9. The functionalized copolymer of claim 8, wherein the conjugated diolefin is isoprene.

10. The functionalized copolymer of claim 8 or 9, wherein the functionalized copolymer has a weight average molecular weight of about 300,000 to about 1,500,000 g/mol.

11. The functionalized copolymer of claim 8 or 9, wherein the functionalized copolymer comprises from about 0.5 to about 20 mol % of the units derived from the conjugated diolefin and about 80 to 99.5 mol % of the units derived from the isoolefin.

12. The functionalized copolymer of claim 8 or 9, wherein the isoolefin comprises isobutylene.

13. The functionalized copolymer of claim 9, wherein 3 to 100% of the isoprene units are functionalized isoprene units.

14. The functionalized copolymer of claim 8 or 9, wherein the repeating units derived from at least one C4-C8 isoolefin comprise units (a), and the repeating units derived from at least one C4-C16 conjugated diolefin comprise units (b) and the functionalized copolymer comprises randomly repeating units a and b and is represented by the formula:

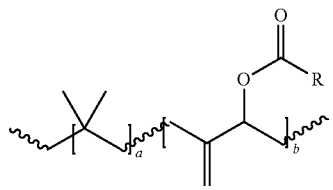

wherein the combination of a+b represents the empirical formula of substantially random graft copolymer, wherein the ratio of a:b is [about 13 to about 2000]: [about to about 200], and R is the leaving group.

15. A process for preparing a graft copolymer, the process comprising:
contacting a functionalized copolymer comprising:
repeating units derived from at least one C4-C8 isoolefin, and
repeating units derived from at least one C4-C16 conjugated diolefin, wherein one or more of the units derived from the at least one conjugated diolefin are functionalized with a group —OC(O)—R represented by:

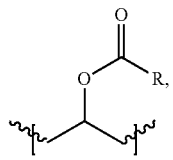

wherein A is a leaving group which is:

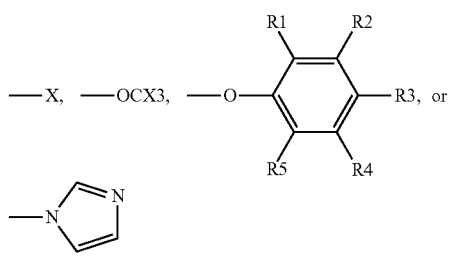

wherein X is halogen, and R1 to R5 are each independently H, NO$_2$, halogen, or C1-C6 alkyl, with a polymeric nucleophile comprising a polymeric substrate having a nucleophilic group capable of donating electrons to a carbonyl group, for nucleophilic substitution of the leaving group of the functionalized copolymer with the polymeric substrate to displace the leaving group and graft the polymeric substrate onto the functionalized copolymer.

16. The process according claim 15, wherein the nucleophilic group is OH, SH, or $NH_2$.

17. The process according to claim 15 or 16, wherein the polymeric nucleophile is polyalkylene oxide.

18. The process according to claim 15, wherein the polymeric nucleophile is represented by the formula:

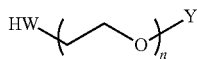

wherein W is O, S or NH, Y is C1-C6 alkyl, and n is an integer from 10 to 120.

19. The process according to claim 15, wherein the polymeric nucleophile is PEO-OH, PEO-SH, or PEO-$NH_2$, where PEO represents polyethylene oxide).

20. The process according to claim 15, wherein the conjugated diolefin is isoprene, and the one or more of the functionalized diolefin units are represented by the formula:

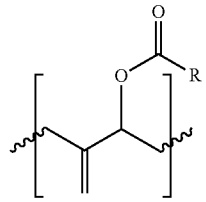

wherein R is the leaving group.

21. The process according claim 15 or 20, wherein the isoolefin comprises isobutylene.

22. The process according to claim 15 or 20 wherein the polymeric nucleophile has a molecular weight of at least 750 g/mol.

23. The process according to claim 15 or 20, wherein the polymeric nucleophile has a molecular weight from about 750 to about 5000 g/mol.

24. The process according to claim 23, wherein the functionalized copolymer has an average molecular weight is of about 300,000 to 1,500,000 g/mol.

25. The process according of claim 15, wherein the copolymer comprises from about 1 to about 20 mol % of the units derived from the conjugated diolefin and about 80 to 99.5 mol % of the units derived from the isoolefin.

* * * * *